(12) United States Patent
Tani

(10) Patent No.: US 10,945,509 B2
(45) Date of Patent: Mar. 16, 2021

(54) APPLICATION CONTAINER

(71) Applicant: TOKIWA CORPORATION, Nakatsugawa (JP)

(72) Inventor: Yoshikazu Tani, Kawaguchi (JP)

(*) Notice: Subject to any disclaimer, the term of this patent is extended or adjusted under 35 U.S.C. 154(b) by 3 days.

(21) Appl. No.: 16/436,927

(22) Filed: Jun. 11, 2019

(65) Prior Publication Data

US 2020/0121058 A1    Apr. 23, 2020

(30) Foreign Application Priority Data

Oct. 18, 2018  (JP) .............................. JP2018-196470

(51) Int. Cl.

| | |
|---|---|
| *A45D 34/04* | (2006.01) |
| *A45D 40/20* | (2006.01) |
| *B43K 27/00* | (2006.01) |
| *B43K 8/03* | (2006.01) |
| *A45D 33/02* | (2006.01) |
| *B43K 24/00* | (2006.01) |
| *B29L 31/00* | (2006.01) |
| *B29C 45/00* | (2006.01) |
| *B29K 55/02* | (2006.01) |

(52) U.S. Cl.
CPC ............ *A45D 34/042* (2013.01); *A45D 33/02* (2013.01); *A45D 40/20* (2013.01); *B43K 8/03* (2013.01); *B43K 24/00* (2013.01); *B43K 27/006* (2013.01); *A45D 2200/1072* (2013.01); *B29C 2045/0043* (2013.01); *B29K 2055/02* (2013.01); *B29L 2031/718* (2013.01)

(58) Field of Classification Search
CPC ........ A45D 40/04; A45D 40/06; A45D 40/24; A45D 2040/208; B43K 21/085
See application file for complete search history.

(56) References Cited

U.S. PATENT DOCUMENTS

| | | | |
|---|---|---|---|
| 2,888,020 A | 5/1959 | Schultz | |
| 3,103,032 A | 9/1963 | Brenne | |
| 5,888,004 A * | 3/1999 | Bouix | ................. A45D 40/04 401/68 |
| 6,257,788 B1 * | 7/2001 | Gueret | ................. A45D 40/265 401/126 |
| 7,077,591 B2 * | 7/2006 | Gueret | ................. A45D 34/06 401/131 |

(Continued)

FOREIGN PATENT DOCUMENTS

| | | |
|---|---|---|
| JP | H1-243007 | 9/1989 |
| JP | H5-038498 | 5/1993 |

(Continued)

*Primary Examiner* — David P Angwin
*Assistant Examiner* — Bradley S Oliver
(74) *Attorney, Agent, or Firm* — Soei Patent & Law Firm

(57) ABSTRACT

An application container includes a main body cylinder, an application tool, and an engagement portion. The main body cylinder has a first end and a second end opposite the first end. The application tool is insertable into the main body cylinder through the first end of the main body cylinder. The engagement portion is positioned within the main body cylinder, and includes a cylindrical portion to connect with the application tool and a connector that connects the cylindrical portion and the main body cylinder. The cylindrical portion of the engagement portion is spaced apart from the main body cylinder.

20 Claims, 24 Drawing Sheets

(56) References Cited

U.S. PATENT DOCUMENTS

| | | | | |
|---|---|---|---|---|
| 7,399,134 B2* | 7/2008 | Gueret | ............... | A45D 34/045 |
| | | | | 215/253 |
| 7,845,871 B2* | 12/2010 | Thiebaut | ............... | A45D 34/06 |
| | | | | 132/314 |
| 7,922,410 B2* | 4/2011 | Gueret | ............... | A46B 9/028 |
| | | | | 401/129 |
| 9,788,635 B2* | 10/2017 | Tani | ............... | A45D 40/06 |
| 10,058,160 B2* | 8/2018 | Chen | ............... | A45D 40/20 |
| 2008/0067170 A1* | 3/2008 | Ponton | ............... | A45D 40/24 |
| | | | | 220/255 |

FOREIGN PATENT DOCUMENTS

| | | |
|---|---|---|
| JP | 2002-142858 | 5/2002 |
| JP | 2007-044301 | 2/2007 |
| JP | 2013-022202 | 2/2013 |
| JP | 2017-012725 | 1/2017 |

\* cited by examiner

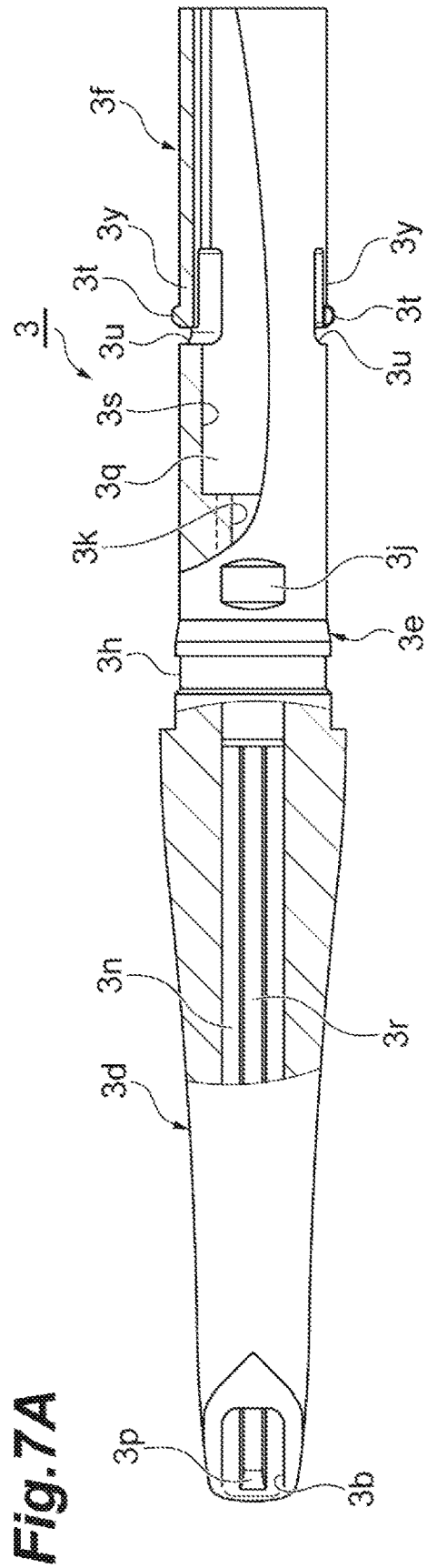
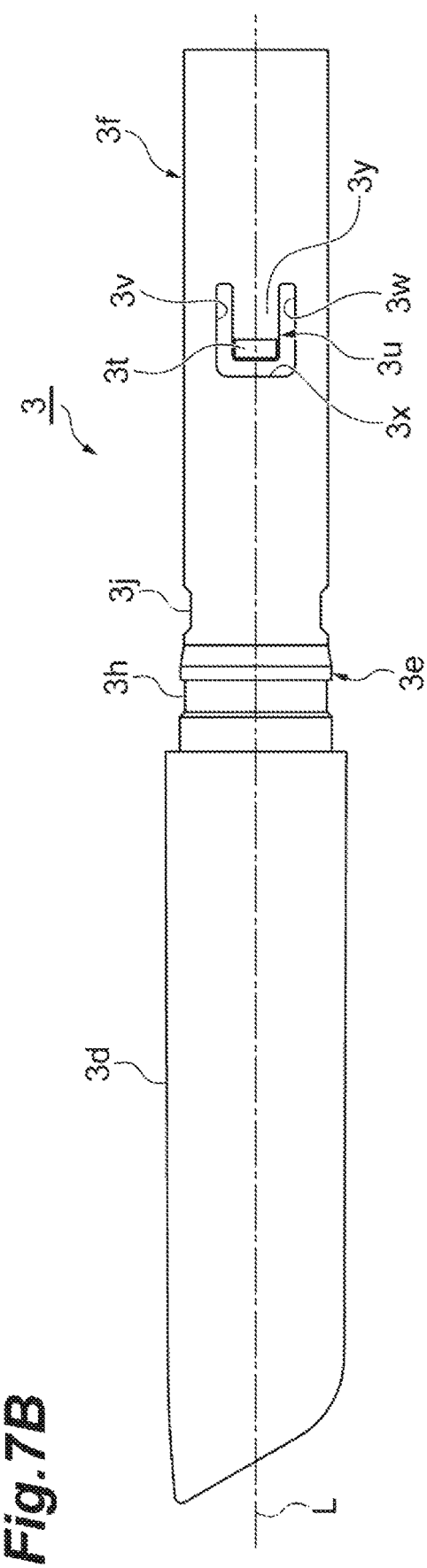
Fig.7A
Fig.7B

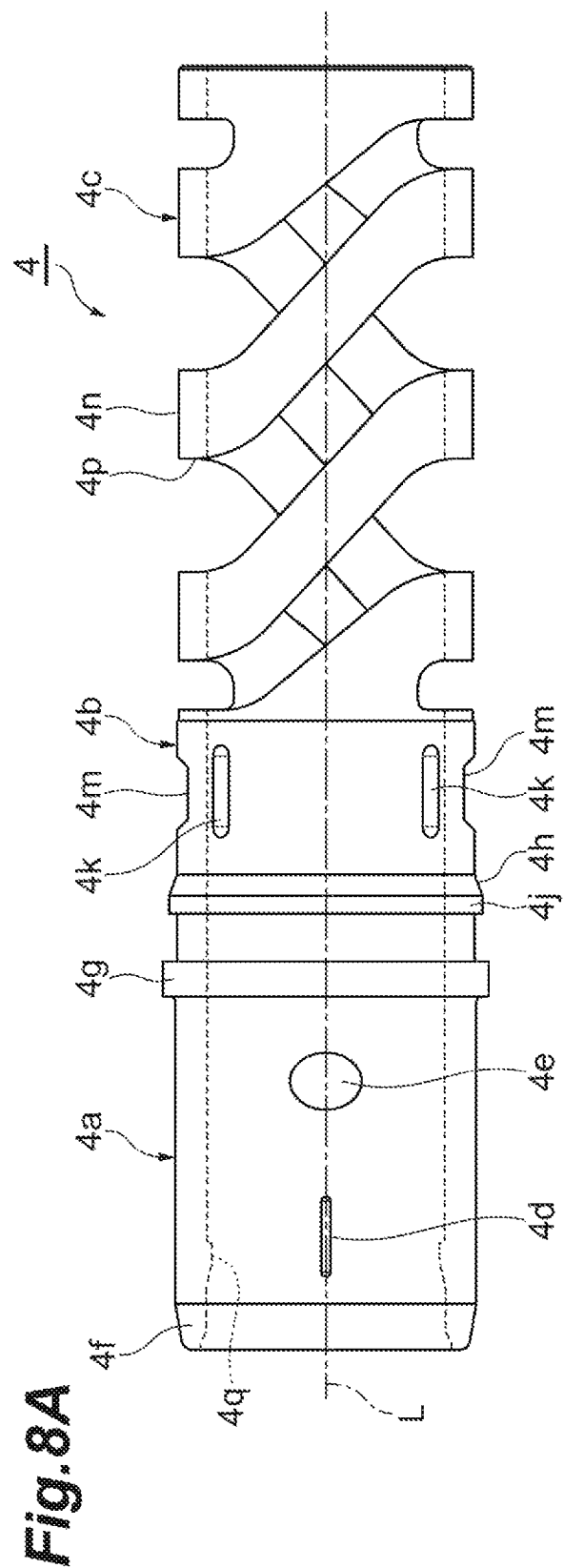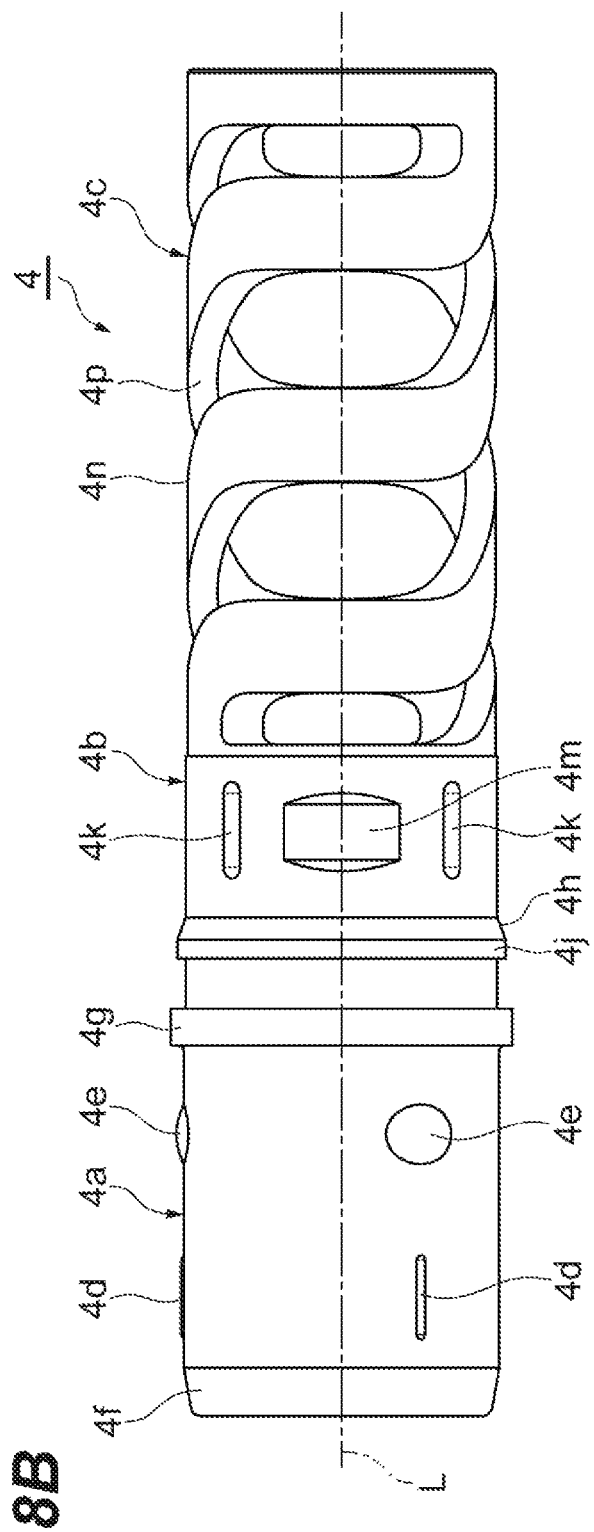

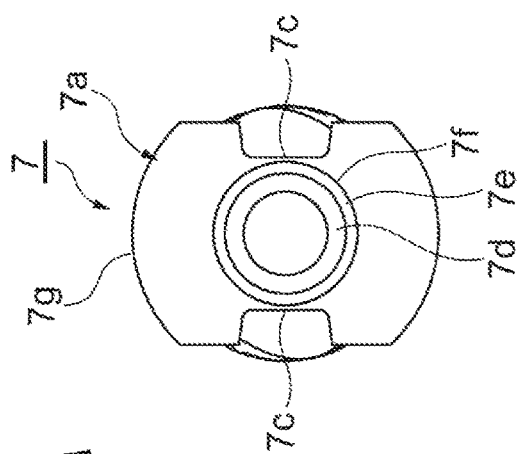
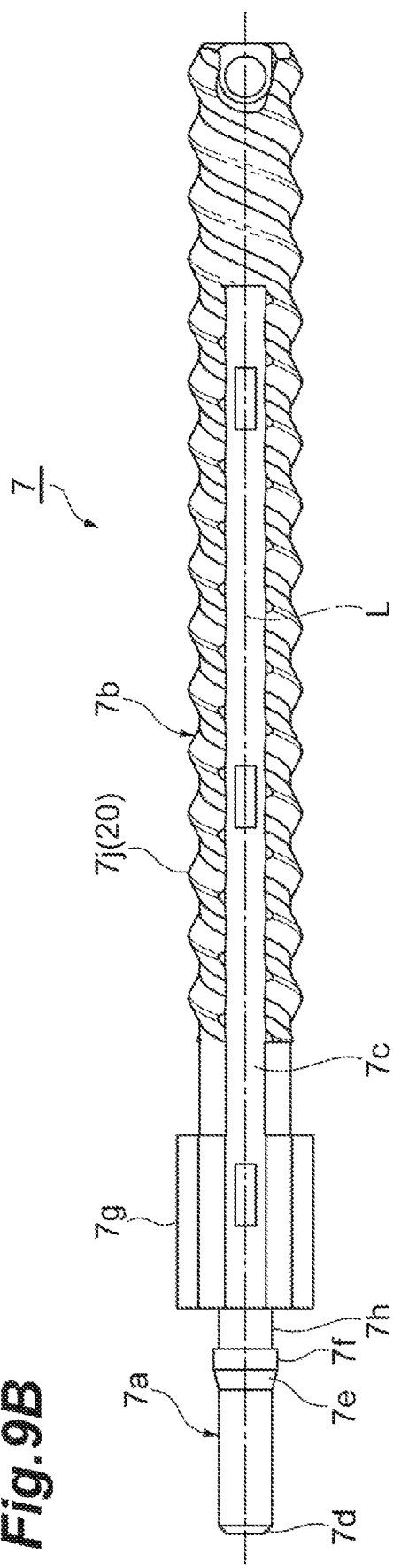
Fig.9A
Fig.9B

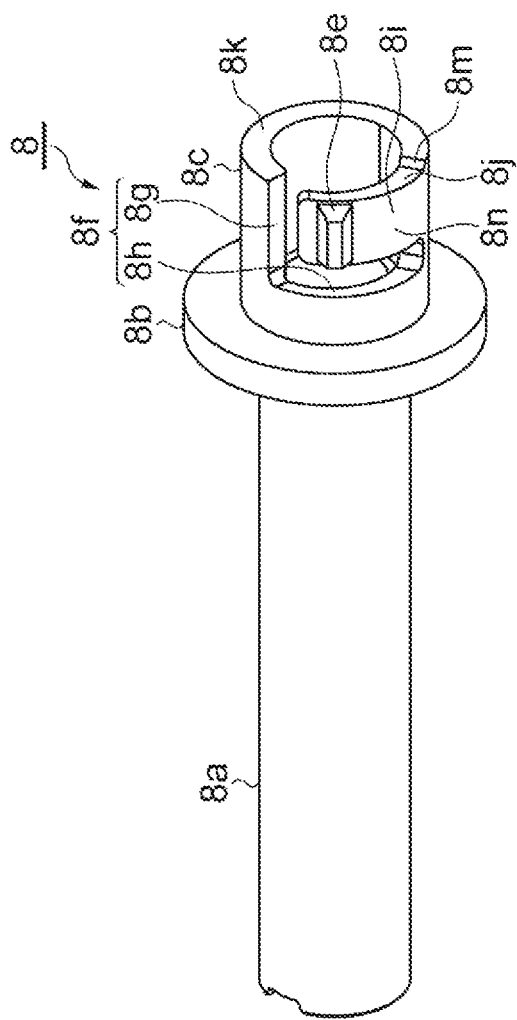
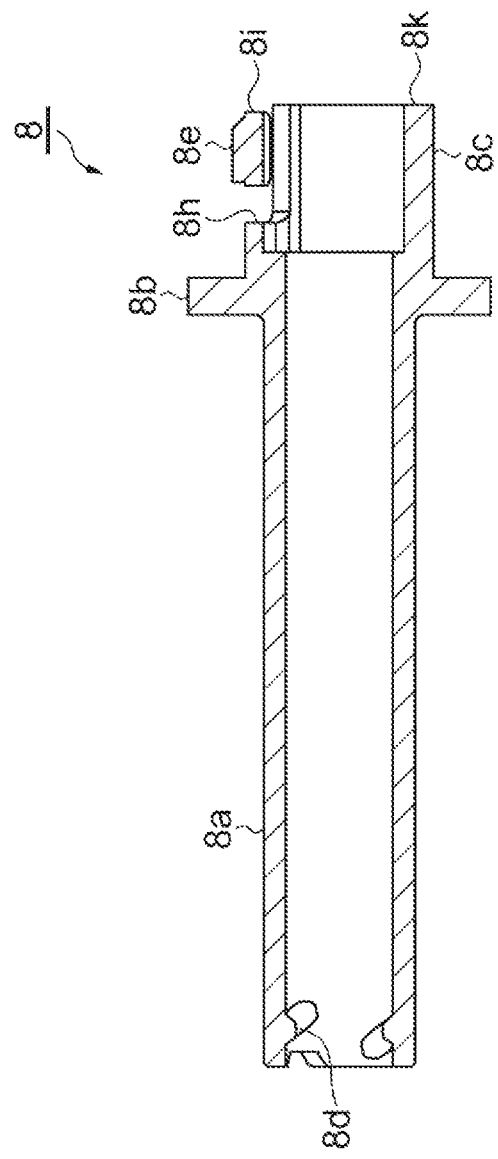
Fig. 10A
Fig. 10B

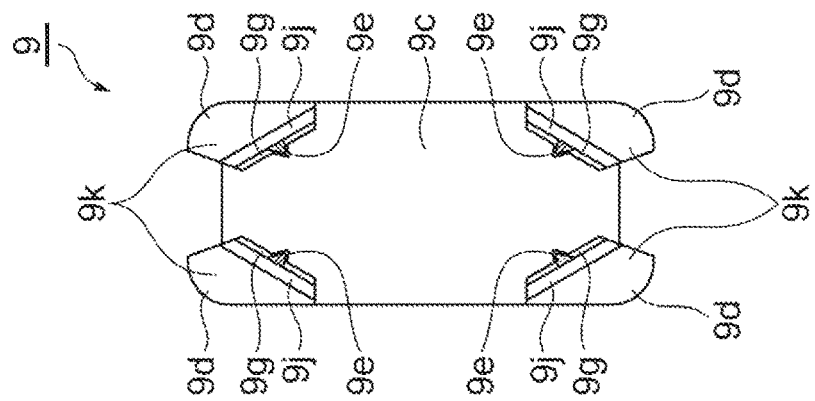
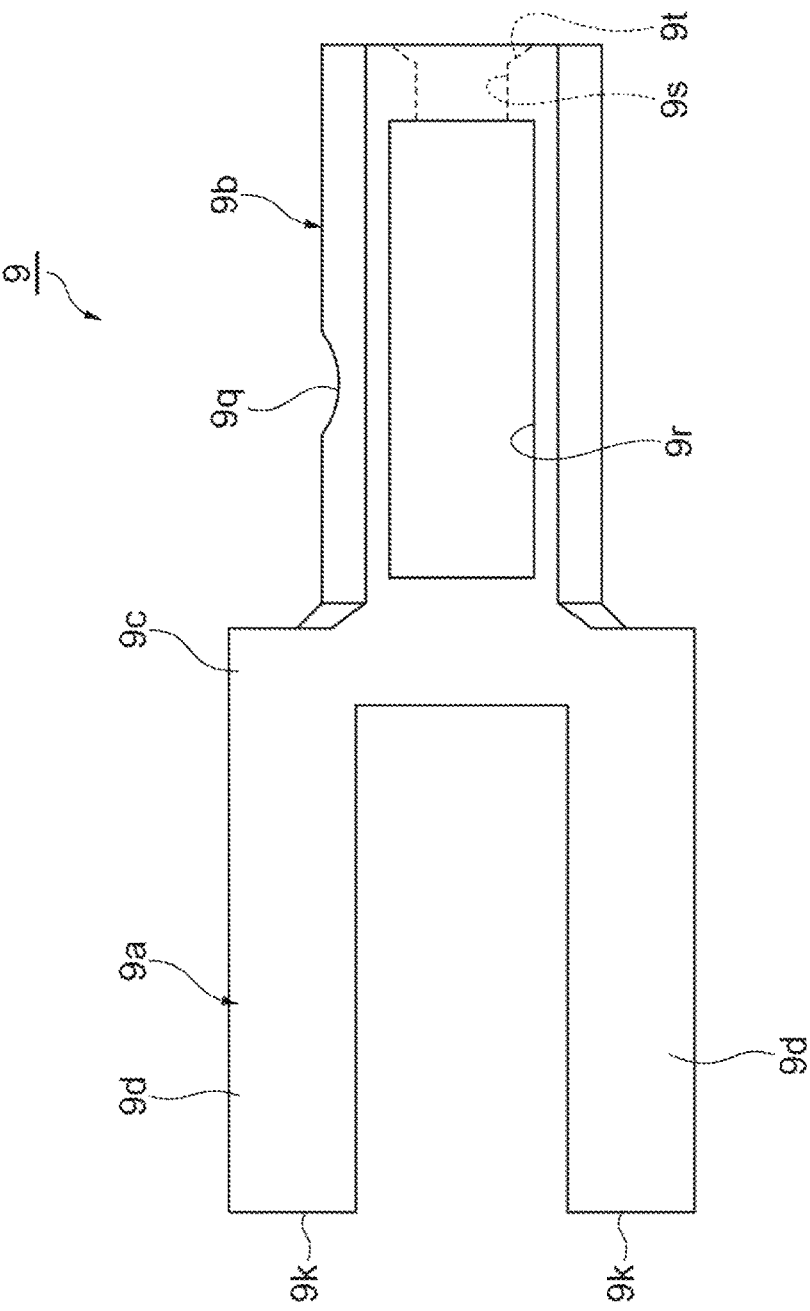
Fig.11A
Fig.11B

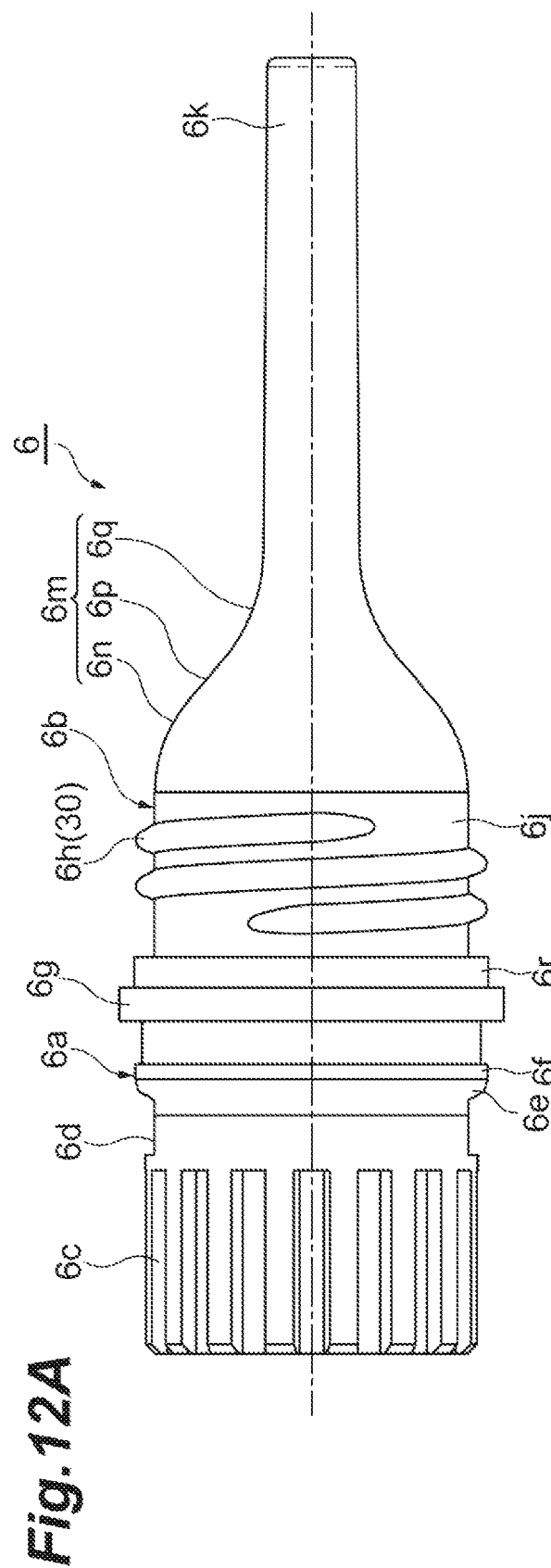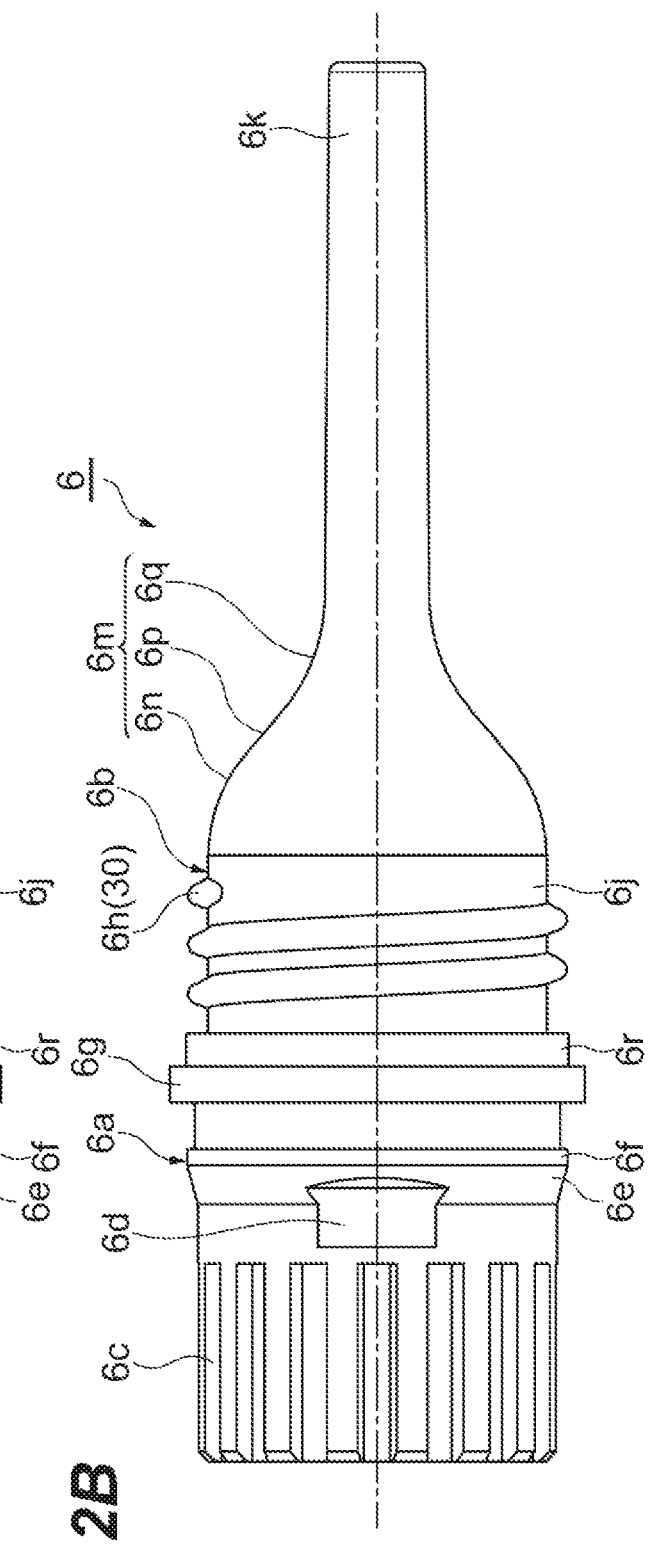

APPLICATION CONTAINER

CROSS-REFERENCE TO RELATED APPLICATIONS

This application claims priority to Japanese Patent Application No. P2018-196470, filed Oct. 18, 2018; the entire contents of which are incorporated herein by reference.

TECHNICAL FIELD

The present disclosure relates to an application container including an application tool.

BACKGROUND

In the related art, various application containers including an application tool are known. For example, Japanese Unexamined Patent Publication No. 2002-142858 discloses a cosmetic material container for containing a liquid cosmetic material. The cosmetic material container includes a leading cylinder into which a push rod for holding a bar-shaped cosmetic material is inserted, a container main body filled with a liquid cosmetic material or a powdery cosmetic material, and a relay tool for relaying the leading cylinder and the container main body.

The relay tool has a cylindrical shape, and the relay tool is internally partitioned into a front portion into which the push rod inside the leading cylinder is inserted and a rear portion to which the container main body is attached. The front portion of the relay tool has a spiral groove to which a male screw disposed in an outer periphery of the push rod is screwed. The push rod is fed forward by a screw mechanism between the push rod and the front portion of the relay tool. The rear portion of the relay tool has a female screw detachably screwed to the male screw disposed in an outer periphery of a front end portion of the container main body.

SUMMARY

In the above-described cosmetic material container, an outer diameter of the container main body attached to the rear portion of the relay tool is larger than an outer diameter of the push rod inserted into the front portion of the relay tool. Accordingly, a thickness of the rear portion of the relay tool is thinner than a thickness of the front portion of the relay tool. In a case where there is a thickness difference in a cylindrical member such as the relay tool in this way, during injection molding of the cylindrical member, a thick portion of the cylindrical member is contracted more than a thin portion of the cylindrical member. In a case where the thickness difference of the cylindrical member is greater, a difference of the contraction also increases, and thus, a recess called a sink mark is likely to appear on a surface of the cylindrical member, which may affect appearance and degrade the dimensional stability of the cylindrical member.

Examples described herein aim to prevent or inhibit a sink mark from appearing on an application container.

According to an example, there is provided an application container including a main body cylinder in which openings are respectively formed in both ends in an axial direction thereof, a first application tool to be disposed on one side of the main body cylinder in the axial direction, and an engagement portion integrated with the main body cylinder inside the main body cylinder, and engaging with the first application tool. The first application tool is disposed inside the opening on the one side of the main body cylinder, and includes an engagement target portion to be engaged with the engagement portion. The engagement portion has a cylindrical portion including an inner peripheral surface into which the engagement target portion is inserted in the axial direction, and which engages with the engagement target portion, and a connector which connects the main body cylinder and the cylindrical portion to each other. An outer peripheral surface of the cylindrical portion is separated from an inner surface of the main body cylinder.

In some examples, the first application tool may include the engagement target portion disposed inside the opening on one side of the main body cylinder, and the engagement portion inside the main body cylinder may engage with the engagement target portion, thereby mounting the first application tool on the main body cylinder. The engagement portion includes the cylindrical portion having the inner peripheral surface into which the engagement target portion is inserted to engage with the engagement target portion, and includes the connector connecting the main body cylinder and the cylindrical portion to each other. The outer peripheral surface of the cylindrical portion is separated from the inner surface of the main body cylinder. The outer peripheral surface of the cylindrical portion engaging with the engagement target portion is separated from the inner surface of the main body cylinder. Therefore, the thickness (e.g., wall thickness) of the main body cylinder in the portion facing (or aligned with) the cylindrical portion can be substantially equal to the thickness (e.g., wall thickness) of the other portion of the main body cylinder. That is, the thickness (e.g., wall thickness) of the main body cylinder can be made more uniform, in order to prevent or inhibit a sink mark from appearing on the surface of the main body cylinder, to improve dimensional stability of the main body cylinder, and/or to improve exterior quality. The outer peripheral surface of the cylindrical portion is separated from the inner surface of the main body cylinder. Accordingly, the thickness (e.g., wall thickness) of the cylindrical portion can be made thinner, and the thickness (e.g., wall thickness) can be made more uniform, in order to prevent or inhibit a sink mark from appearing in the cylindrical portion, and/or to improve the dimensional stability of the cylindrical portion. Since the dimensional stability of the cylindrical portion is improved, the engagement target portion can engage with the cylindrical portion in a more stable, reliable and/or smooth manner.

In some examples, the first application tool may include a first application material disposed on the one side of the main body cylinder, and a feeding mechanism which feeds the first application material to the one side in the axial direction, in order to prevent or inhibit the sink mark from appearing in the application container which feeds the first application material to one side in the axial direction. Accordingly, the feeding mechanism may feed the first application material in a more reliable and/or stable manner.

In some examples, the application container may further include a second application tool disposed on the other side of the main body cylinder in the axial direction. Accordingly, a sink mark can be prevented or inhibited from appearing in an application container that includes multiple types of application tools.

In some examples, the application container may further include a container (e.g., a container portion) to be attached to the opening on the other side of the main body cylinder. The container may contain a second application material to be used for application by the second application tool. The main body cylinder may increase in diameter from the one side toward the other side in the axial direction. An outer diameter of the container may be larger than an outer diameter of the main body cylinder. In this case, a large amount of the second application material can be contained in the container having the large outer diameter. Furthermore, as described above, the main body cylinder increases in diameter on the other side in the axial direction, that is, on the container side (e.g., on the side of the container portion). Accordingly, even in a case where the container (e.g., the container portion) having the larger outer diameter than the main body cylinder is attached to the main body cylinder, the thickness (e.g., wall thickness) of the main body cylinder can be made uniform.

In some examples, the connector may extend along a radial direction of the main body cylinder. In this case, the main body cylinder and the cylindrical portion which have a constant thickness (e.g., wall thickness) can be manufactured by means of integral molding.

In some examples, a thickness (e.g., wall thickness) of the connector may be substantially equal to or less than 60% of a thickness (e.g., wall thickness) of the main body cylinder. In this case, the connector can be made thinner, and a radially thicker portion of the main body cylinder can be reduced. Accordingly, the sink mark can be more reliably prevented from appearing.

In some examples, an inner peripheral surface of the cylindrical portion may have a plurality of irregularities (e.g. ridges, grooves, indentations, or surface patterns) arrayed along a circumferential direction of the cylindrical portion and extending along the axial direction. For example, the irregularities may include ridges or grooves that extend in the axial direction, and that are spaced apart along the circumferential direction of the cylindrical portion, circumferential direction extends along a circumference of the cylindrical portion. The plurality of irregularities (e.g., ridges) may engage with the engagement target portion in a rotation direction. In this case, the engagement between the engagement target portion and the cylindrical portion can be achieved with a relatively simple configuration.

In some examples, the engagement target portion may include a protruding portion which is elastic in the radial direction. The plurality of irregularities (e.g., ridges) may engage with the protruding portion in a rotation direction. The protruding portion and the plurality of irregularities (e.g., ridges) may disengage from each other, when a rotational force of the first application tool with respect to the main body cylinder has a prescribed or greater value. In this case, when the rotation force for relatively rotating the first application tool and the main body cylinder has the prescribed or greater value, the protruding portion and the plurality of irregularities (e.g., ridges) are disengaged from each other. Accordingly, the first application tool or the main body cylinder can be more reliably prevented from being damaged.

The application container according to the above examples are configured to prevent or inhibit a sink mark from appearing.

BRIEF DESCRIPTION OF THE DRAWINGS

FIG. 7A is a partial sectional view of the application container illustrated in FIG. 5, illustrating the leading cylinder.

FIG. 7B is a partial side view of the application container illustrated in FIG. 5, illustrating the leading cylinder.

FIG. 8A is a side view of a middle cylinder of the application container illustrated in FIG. 4.

FIG. 8B is another side view of the middle cylinder shown in

FIG. 8A.

FIG. 9A is a front view of a moving body of the application container illustrated in FIG. 5.

FIG. 9B is a side view of the moving body of the application container illustrated in FIG. 5.

FIG. 10A is a perspective view of a holding member of the application container illustrated in FIG. 5.

FIG. 10B is a longitudinal sectional view of the holding member in FIG. 10A, taken along a plane that includes a center axis of the holding member.

FIG. 11A is a side view of an application material holder of the application container illustrated in FIG. 2.

FIG. 11B is a front view of the application material holder illustrated in FIG. 11A.

FIG. 12A is a side view of an attachment member of the application container illustrated in FIG. 4.

FIG. 12B is another side view of the attachment member of the application container illustrated in FIG. 12A.

FIG. 20A is a longitudinal sectional view illustrating the filling unit, the cover, and the wiper of the application container illustrated in

FIG. 2.

DETAILED DESCRIPTION

In the following description, with reference to the drawings, the same reference numbers are assigned to the same components or to similar components having the same function, and overlapping description is omitted.

Figure 1:
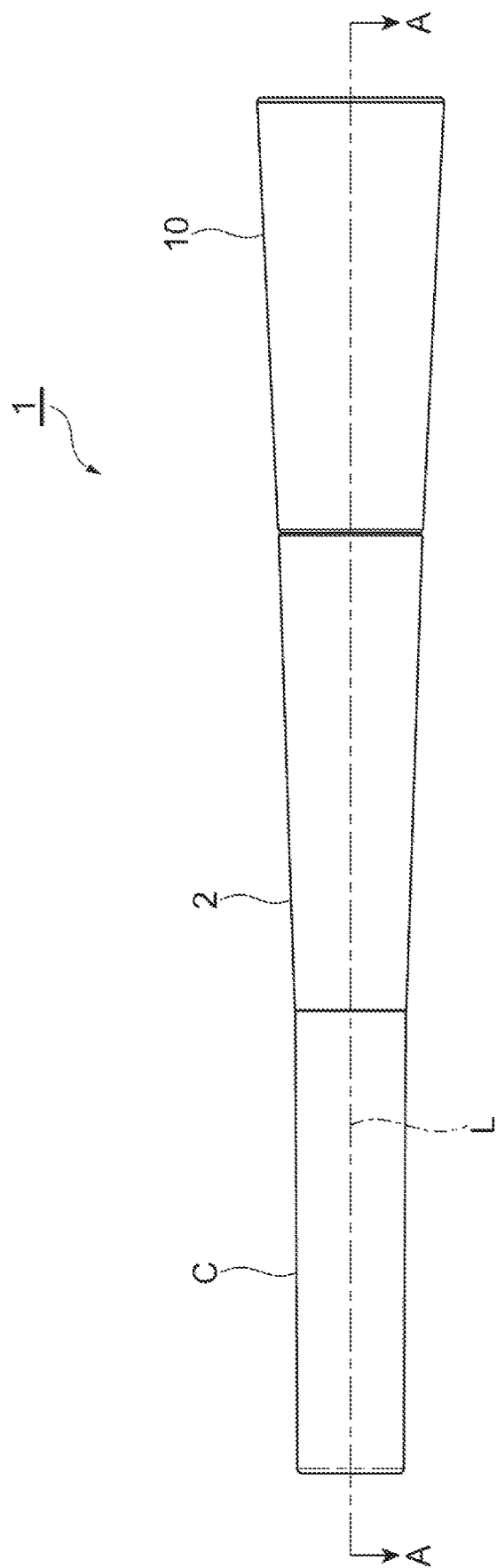
FIG. 1 is a side view of an example application container.
Figure 2:
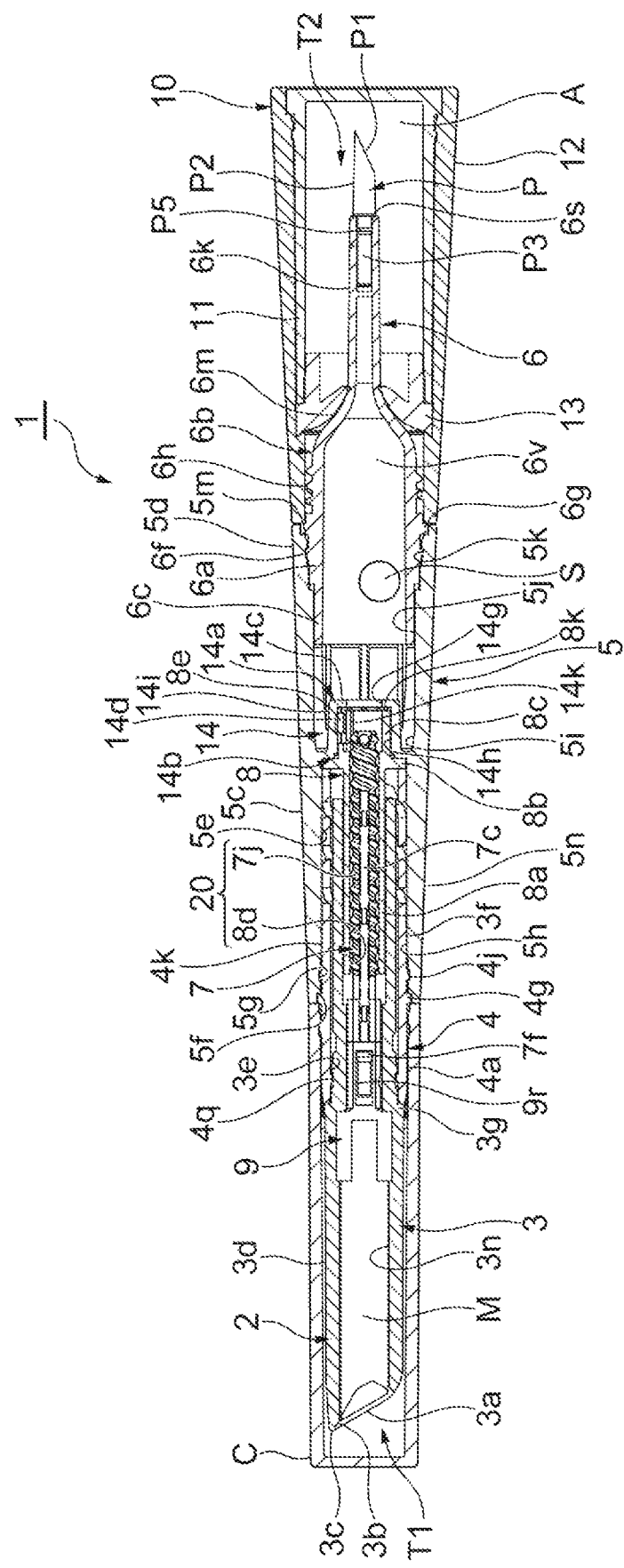
FIG. 2 is a sectional view taken along line A-A of the application container illustrated in FIG. 1.

FIG. 1 is a side view illustrating an example application container 1. FIG. 2 is a sectional view taken along line A-A of the application container 1 illustrated in FIG. 1. The example application container 1 has an overall shape which is an elongated round bar shape like a writing tool, and has a satisfactory external appearance (e.g. an outer profile that is free of any sink mark). A cap C is mounted on the application container. The application container 1 includes a solid bar-shaped application material M. For example, the bar-shaped application material M is a bar-shaped cosmetic material, but may be a drawing material. The bar-shaped application material M may be an eyebrow liner. In this case, the application container 1 is an eyebrow liner feeding container.

In some examples, the application container 1 includes a main body 2 to which the cap C is attached, and a container 10 (e.g. container portion) to be attached to a side (or end) of the main body 2, that is opposite the cap C, and containing the application material A. In some examples, the application material A may be a powder or liquid application material. For example, the application material A is liquid or powder used for an eyeliner, an eye color, an eyebrow liner, a mascara, a concealer, a lip color, or a hair color. In other examples, the application material A is liquid or powder used for stationery goods including a writing tool, a correction fluid, or an adhesive.

In some examples, the cap C, the main body 2, and the container 10 are arranged side by side along an axial direction in which an axis L or center axis L (ref FIG. 1) of the application container 1 extends. In some examples described herein, an "axis" may indicate a center line extending forward to and rearward from the application container 1. An "axial direction" is a forward-rearward direction along the axis L. A feeding direction of the bar-shaped application material M is defined as a forward direction (forward moving direction), and a direction opposite thereto is defined as a rearward direction. A "front", a "front side", a "front end" or the like, may refer to a side of a the application container or of a component thereof that is positioned toward the cap C or toward the application material M, in the example of FIG. 1. Accordingly, a "forward direction", "in front of" or the like may refer to a direction toward the cap C relative to the main body 2. A "rear", a "rear side", a "rear end" or the like, may refer to a side of a the application container or of a component thereof that is positioned toward the container portion 10, in the example of FIG. 1. Accordingly, a "rearward direction", "behind" or the like may refer to a direction toward the container portion 10, relative to the main body 2.

Figure 3:
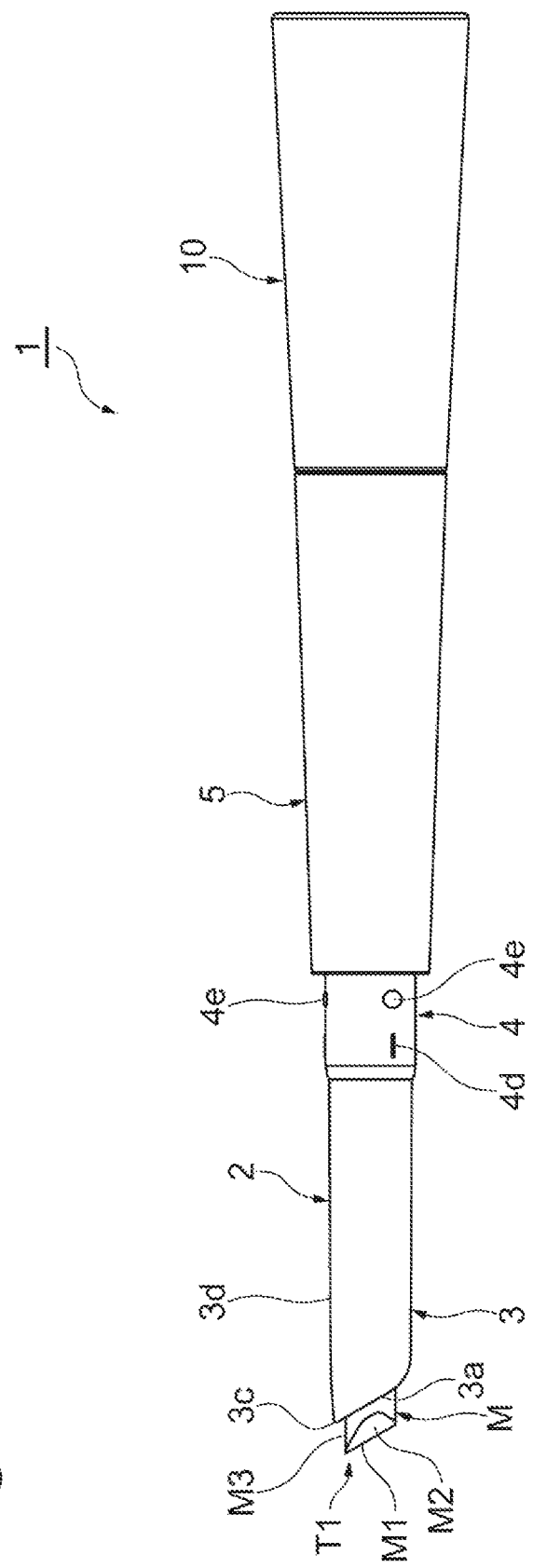
FIG. 3 is a side view of the application container illustrated in FIG. 1, in an example state where a cap is removed.
Figure 4:
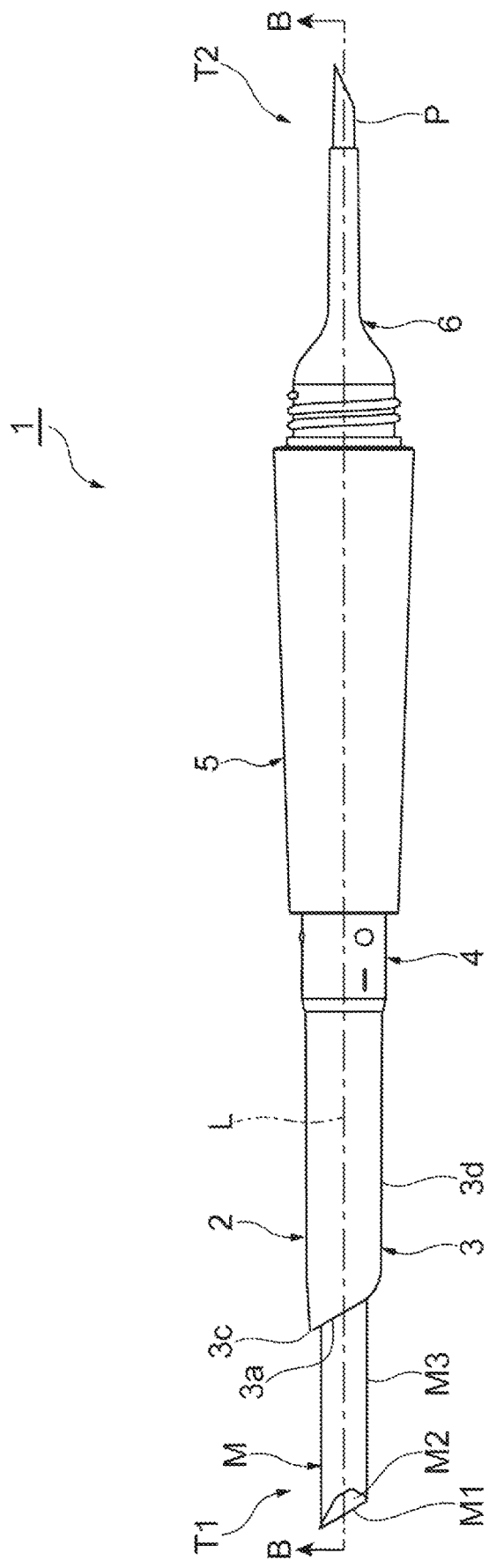
FIG. 4 is a side view of the application container illustrated in FIG. 3, in an example state where a bar-shaped application material is fed from the application container.
Figure 5:
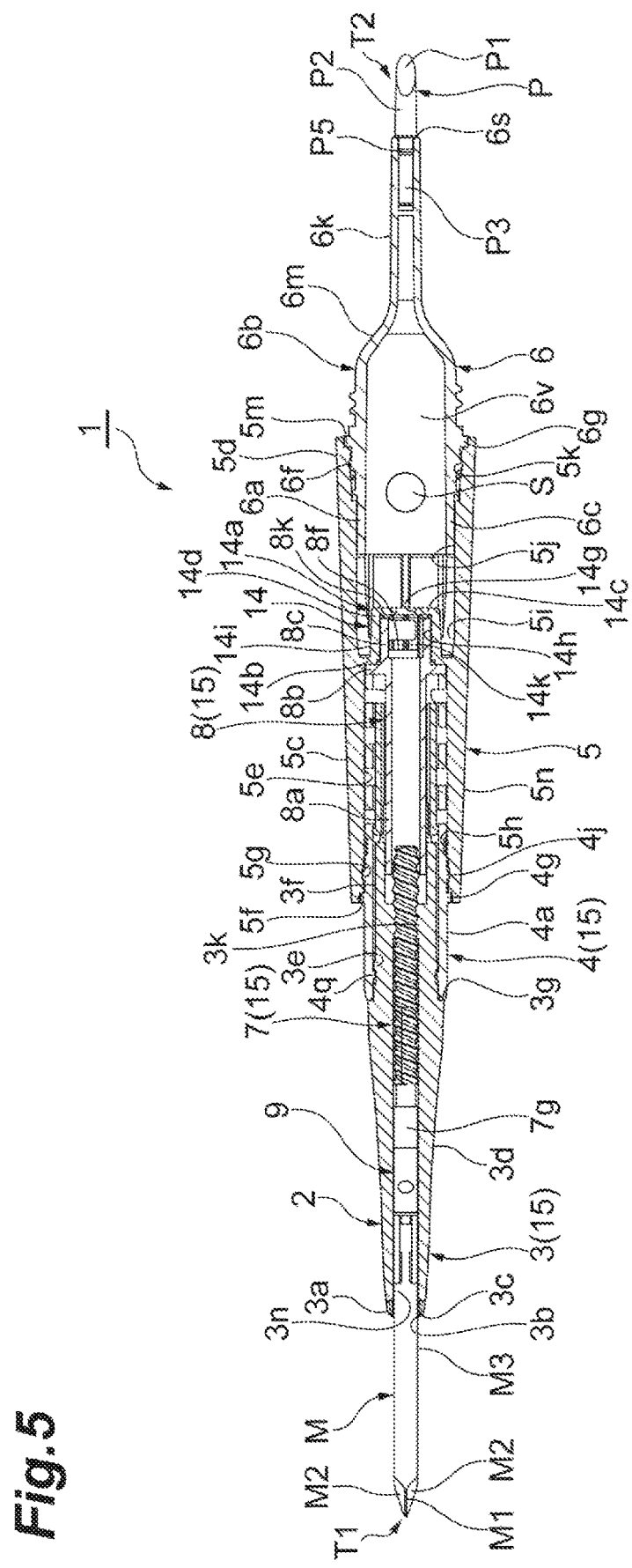
FIG. 5 is a sectional view taken along line B-B of the application container illustrated in FIG. 4.

FIG. 3 is a side view illustrating the application container 1 from which the cap C is removed. FIG. 4 is a side view illustrating a state where the bar-shaped application material M is fed by removing the container 10 from the application container 1 illustrated in FIG. 3. FIG. 5 is a sectional view taken along line B-B in FIG. 4. As illustrated in FIGS. 3 to 5, the main body 2 includes an application tool T1 (e.g., first application tool) positioned on a front side of the main body 2, an application tool T2 (e.g., second application tool) positioned on a rear side of the main body 2, a coupling cylinder 5 (e.g., main body cylinder) and an engagement portion 14. The a coupling cylinder 5 connects the application tool T1 to the application tool T2 and is exposed outwardly of the application container 1. The engagement portion 14 provides an internal partition in the coupling cylinder 5 and engages with the application tool T1.

The application tool T1 is positioned in front of the coupling cylinder 5, and extends along the axial direction. The application tool T1 includes the above-described bar-shaped application material M positioned on a front side of the application tool T1, a leading cylinder 3 for containing the bar-shaped application material M, a middle cylinder 4 positioned behind the leading cylinder 3, a moving body 7 accommodated inside the leading cylinder 3, a holding member 8 positioned on the rear side of the application tool T1 and holding the moving body 7 inside the coupling cylinder 5, and an application material holder 9 for holding the bar-shaped application material M on the front side of the moving body 7. The leading cylinder 3, the middle cylinder 4, the moving body 7, and the holding member 8 form a feeding mechanism 15 configured to feed the bar-shaped application material M in the axial direction.

The bar-shaped application material M has a side surface M3 extending in the axial direction, and a leading end of the bar-shaped application material M has an inclined portion M1 inclined with respect to the axial direction. A shape of the bar-shaped application material M when viewed from the front side is formed so that the inclined portion M1 extends lengthwise in a uniform direction. In addition, a flat surface M2 extending in a direction inclined with respect to the axial direction is formed between the inclined portion M1 located in the leading end of the bar-shaped application material M and the side surface M3 of the bar-shaped application material M. In some examples, two flat surfaces M2 are positioned on right and left sides with respect to the inclined portion M1. In some examples, each of the flat surfaces M2 extends rearwardly from both sides of the inclined portion M1 in a longitudinal direction. When viewed from the front side, the inclined portion M1 and the two flat surfaces M2 form a rounded hexagonal shape that extends lengthwise in a uniform direction.

In some examples, the leading cylinder 3 is molded using an Acrylonitrile Butadiene Styrene (ABS) resin, and shows an elongated cylindrical shape extending in the axial direction. An interior of the leading cylinder 3 serves as an accommodation space 3n for accommodating the bar-shaped application material M. A front end 3c of the leading cylinder 3 has an inclined surface 3a inclined with respect to the axial direction. An opening 3b from which the bar-shaped application material M is exposed is formed in the front end 3c of the leading cylinder 3. The opening 3b extends obliquely rearward from the front end 3c of the leading cylinder 3.

The leading cylinder 3 has a front side cylindrical portion 3d for containing the bar-shaped application material M, a stepped cylindrical portion 3e located behind the front side cylindrical portion 3d, and a rear side cylindrical portion 3f located behind the stepped cylindrical portion 3e. Among the front side cylindrical portion 3d, the stepped cylindrical portion 3e, and the rear side cylindrical portion 3f, the front side cylindrical portion 3d is exposed outwardly. The front side cylindrical portion 3d gradually decreases in diameter from a step 3g toward a front end 3c. The step 3g is located between the front side cylindrical portion 3d and the stepped cylindrical portion 3e, and the front side cylindrical portion 3d and the step 3g increase in diameter from the stepped cylindrical portion 3e. A rear end (e.g., a side behind the step 3g) of the leading cylinder 3 behind the step 3g, serves as an insertion portion to be inserted into the middle cylinder 4 from a front end of the middle cylinder 4. The rear end of the leading cylinder 3 is inserted into the middle cylinder 4. In this manner, the leading cylinder 3 engages with the middle cylinder 4 in the axial direction to be rotatable relative to the middle cylinder 4. The leading cylinder 3 and the middle cylinder 4 may engage with each other in a state leading cylinder 3 is movable relative to the middle cylinder 4 in the axial direction, by no more than approximately 0.1 mm. In this case, the leading cylinder 3 and the middle cylinder 4 can be more easily rotated relative to each other.

Figure 6:
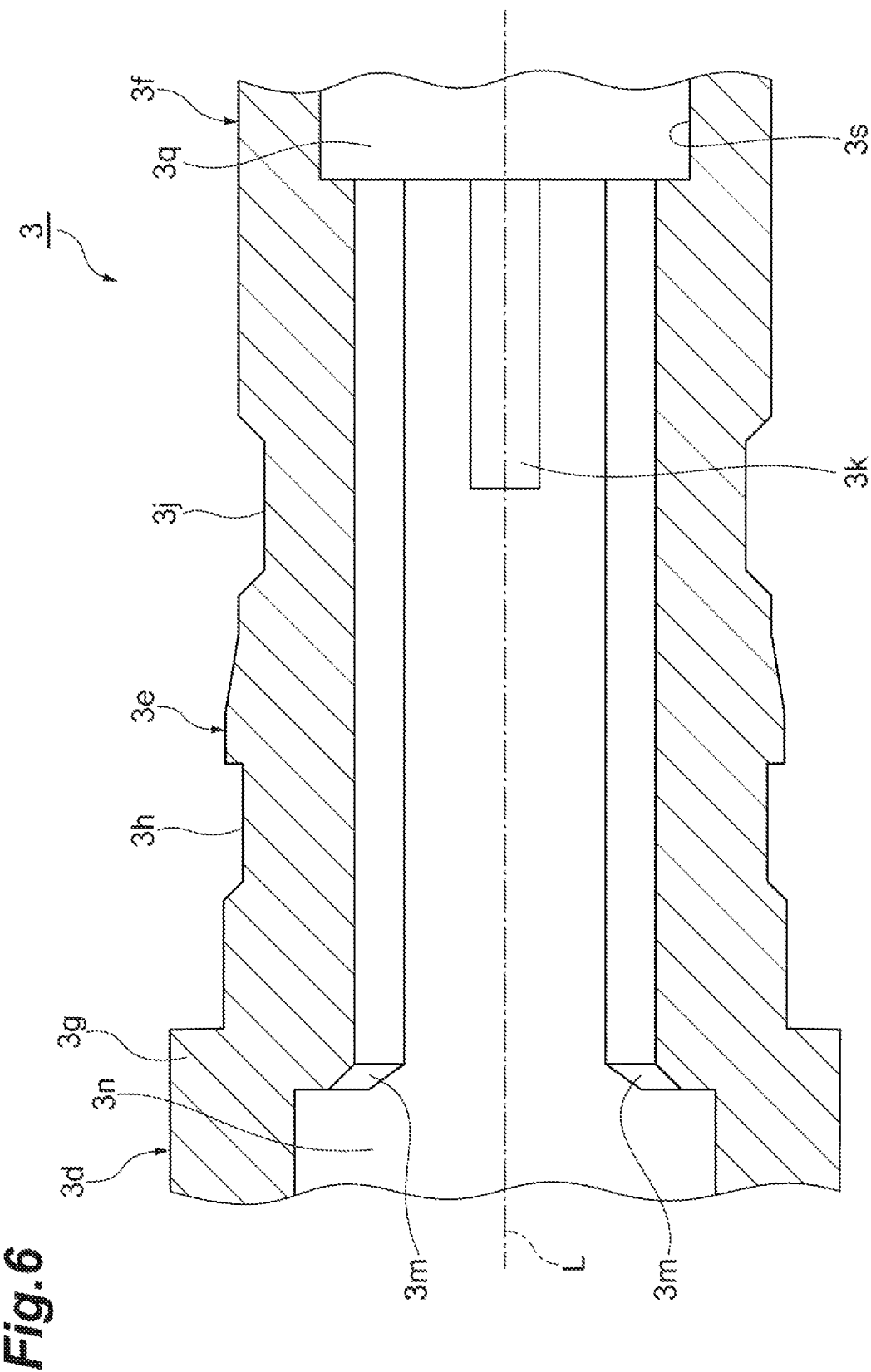
FIG. 6 is an enlarged sectional view of a portion of the application container illustrated in FIG. 5, illustrating a stepped cylindrical portion of a leading cylinder in the application container.

FIG. 6 is a sectional view in which the stepped cylindrical portion 3e of the leading cylinder 3 is cut along a plane including the axial direction. FIG. 7A is a partial sectional view of the leading cylinder 3. FIG. 7B is a side view of the leading cylinder 3. As illustrated in FIGS. 6, 7A, and 7B, inside the front side cylindrical portion 3d of the leading cylinder 3, the accommodation space 3n for accommodating the bar-shaped application material M extends along the axial direction. A shape of the accommodation space 3n when viewed along the axial direction is a non-circular shape. For example, the shape extends long in a uniform direction. A projection portion 3r extending in the axial direction is positioned inside the front side cylindrical portion 3d of the leading cylinder 3. For example, a pair of the projection portions 3r is positioned along the radial direction of the leading cylinder 3.

A front end of the projection portion 3r leads toward the opening 3b of the leading cylinder 3. The front end of the projection portion 3r has an inclined surface 3p which protrudes by being bent inward of the leading cylinder 3 as the inclined surface 3p is oriented rearward (e.g. the inclined surface 3p is inclined inwardly toward the rear). An outer surface of the stepped cylindrical portion 3e of the leading cylinder 3 has an annular recess portion 3h extending in the circumferential direction of the leading cylinder 3, and a recess portion 3j located behind the annular recess portion 3h. When the leading cylinder 3 is manufactured by means of molding, an injection port for injecting a resin material or the like into a molding die is located at the center of the recess portion 3j. For example, a pair of the recess portions 3j may be positioned along the radial direction of the leading cylinder 3, with each of the recess portions 3j having a rectangular shape.

A ridge 3k extending in the axial direction is positioned inside the stepped cylindrical portion 3e of the leading cylinder 3. In some examples, a plurality of the ridges 3k are positioned inside the stepped cylindrical portion 3e. Each the ridges 3k extends from the rear side of the stepped cylindrical portion 3e to an inner surface of the rear side cylindrical portion 3f. For example, a pair of the ridges 3k may be positioned along the radial direction of the leading cylinder 3. The rear side of the accommodation space 3n for accommodating the bar-shaped application material M has a tapered surface 3m inclined inwardly in the radial direction, toward the rear (e.g., the tapered surface 3m is inclined rearwardly as the tapered surface 3m is oriented inward in the radial direction).

The rear side (or rear end) of the ridge 3k serves as an internal space 3q of the rear side cylindrical portion 3f. The internal space 3q has a larger diameter than a portion having the ridge 3k. The rear side cylindrical portion 3f includes an elastic protruding portion 3t at a pair of positions facing each other on an inner peripheral surface 3s of the rear side cylindrical portion 3f. The elastic protruding portion 3t is configured to contact the inner surface of the middle cylinder 4 by using an elastic force, and is positioned to protrude outward in the radial direction. A notch 3u allowing the inside and the outside of the leading cylinder 3 to communicate with each other is formed around the elastic protruding portion 3t. The elastic protruding portion 3t is elastic in the radial direction by way of the notch 3u.

The notch 3u is U-shaped and includes a pair of slits 3v and 3w, and a slit 3x. The pair of slits 3v and 3w are arranged side by side (substantially parallel) at a plurality of positions along the circumferential direction of the leading cylinder 3 and extend in the axial direction. The slit 3x drilled on the front side of the elastic protruding portion 3t, extends in the circumferential direction of the leading cylinder 3 between the slits 3v and 3w. The U-shaped notch 3u in the rear side cylindrical portion 3f surrounds an arm 3y which is flexible in the radial direction. Accordingly, the elastic protruding portion 3t located on the outer surface of the leading end portion of the arm 3y has an elastic force (biasing force) acting in the radial direction.

In some examples, an annular projection 4q on the inner surface of the middle cylinder 4 engages with the stepped cylindrical portion 3e to be rotatable relative to the leading cylinder 3, in the axial direction, and the elastic protruding portion 3t contacts the inner surface of the middle cylinder 4. FIG. 8A is a first side view illustrating the middle cylinder 4. FIG. 8B is a second side view of the middle cylinder 4, viewed from a direction, different from that in FIG. 8A. For example, the middle cylinder 4 is molded using polyacetal (POM), and is formed into a substantially a cylindrical shape.

In some examples, the middle cylinder 4 includes a front side cylindrical portion 4a, a rear side cylindrical portion 4b, and a spring portion 4c, respectively positioned from the front end toward the rear end. The middle cylinder 4 is configured to soften an impact transmitted internally when an external force is applied to the application container 1, such as when the application container is dropped for example, thereby protecting the application container 1 and the bar-shaped application material M. The spring portion 4c of the middle cylinder 4 is configured to screw back the screw portion 20 used for attaching the moving body 7 to the holding member 8 when a clutch is rotated up to a rearward movement limit of the bar-shaped application material M. The front end portion on the outer peripheral surface of the front side cylindrical portion 4a has an inclined surface 4f which gradually increases in diameter toward the rear. The outer peripheral surface of the front side cylindrical portion 4a has a protruding portion 4d extending in the axial direction, and a projection 4e projecting in a substantially circular shape behind the protruding portion 4d. The cap C engages with the protruding portion 4d and the projection 4e.

A flange portion 4g protruding outwardly in the radial direction and configured to enter the front end of the coupling cylinder 5 is positioned between the front side cylindrical portion 4a and the rear side cylindrical portion 4b. The outer surface of the rear side cylindrical portion 4b has an annular projection 4j having an inclined surface 4h which decreases in diameter toward the rear, a plurality of protruding portions 4k extending in the axial direction behind the annular projection 4j and arranged side by side along the circumferential direction of the middle cylinder 4, and a recess portion 4m recessed between the plurality of protruding portions 4k. When the middle cylinder 4 is manufactured by means of molding, an injection port for injecting a resin material or the like into a molding die is located at the center of the recess portion 4m. The spring portion 4c is positioned behind the protruding portion 4k and the recess portion 4m. The spring portion 4c is a resin spring configured to stretch and compress in the axial direction. The spring portion 4c includes a main body portion 4n and a slit 4p which extends in a spiral shape in a peripheral surface of the main body portion 4n and which allows the inside of the main body portion 4n to communicate with and the outside of the main body portion 4n. The spring portion 4c softens an impact by shrinking or compressing when an external force is applied thereto. A rear side portion of the middle cylinder 4 from the front side cylindrical portion 4a is inserted into a front side of the coupling cylinder 5.

FIG. 9A is a front view when the moving body 7 is viewed from the front side. FIG. 9B is a side view of the moving body 7. In some examples, the moving body 7 is molded using a POM, and is formed into a round bar shape. The moving body 7 includes a connector 7a positioned on the front side and connected to the application material holder 9, and a shaft body portion 7b extending rearward from the connector 7a. The outer surface of the connector 7a and the outer surface of the shaft body portion 7b have a groove portion 7c extending in the axial direction. The groove portion 7c is configured to function as a detent for the moving body 7 against the leading cylinder 3, together with the ridge 3k positioned on the inner surface of the leading cylinder 3. For example, a pair of the groove portions 7c is positioned in the radial direction of the moving body 7.

The front end of the connector 7a of the moving body 7 has a tapered surface 7d, an annular projection 7f and an enlarged diameter portion 7g. The tapered surface 7d increases in diameter rearwardly. The annular projection 7f has a tapered surface 7e which gradually increases in diameter rearwardly, behind the tapered surface 7d. The enlarged diameter portion 7g further increases in diameter rearwardly from the annular projection 7f. A portion between the annular projection 7f and the enlarged diameter portion 7g serves as a reduced diameter portion 7h which decreases in diameter than the annular projection 7f and the enlarged diameter portion 7g.

The shaft body portion 7b extends in the axial direction from the rear end of the connector 7a. The outer surface of the shaft body portion 7b has a male screw 7j that forms a first one of screw portions 20. The male screw 7j is formed throughout the axial direction of the shaft body portion 7b. The annular projection 7f is inserted into the application material holder 9. The front end of the enlarged diameter portion 7g contacts the rear end of the application material holder 9. The moving body 7 engages with the application material holder 9 in the axial direction. The moving body 7 has a groove portion 7c that engages with the ridge 3k formed on the inner surface of the leading cylinder 3 in the rotation direction.

FIG. 10A is a perspective view illustrating the holding member 8. FIG. 10B is a longitudinal sectional view when the holding member 8 in FIG. 10A is cut along a plane including the axial direction (e.g. the center axis of the holding member). For example, the holding member 8 is formed of a POM, and is formed into a substantially a cylindrical shape. As illustrated in FIGS. 10A and 10B the holding member 8 has a front side cylindrical portion 8a, a flange portion 8b and a rear side cylindrical portion 8c. The front side cylindrical portion 8a extends from the front end of the holding member 8 in the axial direction. The flange portion 8b increases in diameter in the rear end of the front side cylindrical portion 8a. The rear side cylindrical portion 8c located at a rear side of the flange portion 8b, engages with the engagement portion 14a. The inner surface of the front end portion of the front side cylindrical portion 8a has a spiral projection 8d that forms a second one of screw portions 20 to be coupled with the male screw 7j (e.g., the first one of screw portions 20). The rear side cylindrical portion 8c is set to have a cylindrical shape whose axis L serves as a central axis.

The rear side cylindrical portion 8c of the holding member 8 includes an elastic protruding portion 8e. The elastic protruding portion Se is configured to engage the engagement portion 14 in the rotation direction, and protrudes outwardly in the radial direction from the outer surface of the rear end portion of the rear side cylindrical portion 8c. A periphery of the elastic protruding portion 8e has a notch 8f which allows the inside of the holding member 8 to communicate with the and the outside of the holding member 8. The elastic protruding portion 8e is elastic in the radial direction by way of the notch 8f. For example, a shape of the notch 8f is an L-shape. The notch 8f includes a slit 8g extending along the axial direction from the rear end of the rear side cylindrical portion 8c and a slit 8h extending in the circumferential direction from the front end of the slit 8g. A portion surrounded by way of the notch 8f in the rear side cylindrical portion 8c forms an arm 8i which is flexible in the radial direction. The arm 8i has an end surface 8j that faces toward the rear (e.g., located on the front side from the rear end surface 8k of the rear side cylindrical portion 8c). As a surface inclined forward from the rear end surface 8k, an inclined surface 8m leading to the end surface 8j is formed between the end surface 8j of the arm 8i and the rear end surface 8k of the rear side cylindrical portion 8c.

The elastic protruding portion 8e protrudes from an outer surface 8n in a distal end portion of the arm 8i, and has an elastic force (biasing force) in the radial direction by the flexibility of the arm 8i. The elastic protruding portion 8e extends along the axial direction on the outer surface 8n. A cross-section of the elastic protruding portion 8e, taken along a plane orthogonal to the axial direction has a trapezoidal shape having a leg whose width is narrowed in the circumferential direction as the leg is oriented outward in the radial direction. As illustrated in FIGS. 2 and 5, the moving body 7 is inserted into the holding member 8 from the front side, and the projection 8d of the front side cylindrical portion 8a is screwed into the male screw 7j of the moving body 7. The holding member 8 is accommodated inside the coupling cylinder 5, and the elastic protruding portion 8e of the rear side cylindrical portion 8c is configured to engage the engagement portion 14.

FIG. 11A is a side view illustrating the application material holder 9. FIG. 11B is a front view when the application material holder 9 is viewed from the front side. The application material holder 9 is inserted into the leading cylinder 3 to hold the bar-shaped application material M. For example, a material of the application material holder 9 is polybutylene terephthalate (PBT). As illustrated in FIGS. 11A and 11B, the application material holder 9 includes a gripper 9a located on the front side to grip the bar-shaped application material M, and a support portion 9b extending rearwardly from the gripper 9a and supporting the moving body 7. For example, a shape of the application material holder 9 when viewed along the axial direction is a non-circular shape. For example, the application material holder may have a rectangular shape which is elongated in one direction (e.g., extends lengthwise in one direction) and which has corner portions that are rounded.

The gripper 9a includes a base portion 9c forming a connector between the gripper 9a and the support portion 9b, and a plurality of arms 9d extending forward from the base portion 9c and gripping the bar-shaped application material M. The bar-shaped application material M is gripped inside a plurality of the arms 9d. The inner surface of the respective arms 9d has protruding portion 9e extending in the axial direction along the arm 9d. Each protruding portion 9e fits into the bar-shaped application material M, thereby allowing the bar-shaped application material M to be properly held by the application material holder 9.

Each protruding portion 9e when viewed along the axial direction has a triangular shape whose leading end is rounded. Each arm 9d decreases forward in thickness. The arm 9d has a first inclined surface 9g and a second inclined surface 9j sequentially forward from the base portion 9c. A portion between the base portion 9c and the first inclined surface 9g of the arm 9d, a portion between the first inclined surface 9g and the second inclined surface 9j of the arm 9d, and a portion between the second inclined surface 9j and the front end 9k of the arm 9d extend in the axial direction.

The thickness of the arm 9d between the base portion 9c and the first inclined surface 9g is greater than the thickness of the arm 9d between the first inclined surface 9g and the second inclined surface 9j. The thickness of the arm 9d between the first inclined surface 9g and the second inclined surface 9j is greater than the thickness of the arm 9d between the second inclined surface 9j and the front end 9k. The height of the protruding portion 9e of the arm 9d is constant along the axial direction. Accordingly, a protruding height of the protruding portion 9e from a top surface of the first inclined surface 9g is lower than a protruding height of the protruding portion 9e from a top surface of the second inclined surface 9j.

The support portion 9b of the application material holder 9 extends from the base portion 9c to a side opposite (e.g., rearward) to the gripper 9a. For example, the support portion 9b is formed a bottomed cylindrical shape. The support portion 9b has a recess portion 9q positioned on an outer surface thereof, a window portion 9r which allows the inside of the support portion 9b to communicate with the outside of the support portion 9b, and a through-hole 9s positioned in the rear end of the application material holder 9 and penetrating the application material holder 9 in the axial direction. An injection port for injecting a resin material or the like into a molding die when the application material holder 9 is manufactured by means of molding is located at the center of the recess portion 9q. The rear end portion of the through-hole 9s has a tapered surface 9t which increases rearwardly in diameter. For example, the recess portion 9q has a circular shape, and the window portion 9r has a rectangular shape extending lengthwise in the axial direction. The window portion 9r and the through-hole 9s communicate with each other. The through-hole 9s when viewed from the rear has a circular shape.

In some examples, the moving body 7 is inserted into the through-hole 9s of the application material holder 9 from behind. In the application material holder 9, the annular projection 7f of the moving body 7 rides over the inner surface of the through-hole 9s. The annular projection 7f fits into the window portion 9r, and is exposed outwardly from the window portion 9r. In this manner, the application material holder 9 engages with the moving body 7 to be immovable in the axial direction. The application material holder 9 having the non-circular shape enters the accommodation space 3n having the non-circular shape. In this manner, the application material holder 9 engages with the leading cylinder 3 in the rotation direction, and is synchronously rotated with the leading cylinder 3.

As illustrated in FIGS. 2, 4, and 5, the application tool T2 is positioned behind the coupling cylinder 5, and extends along the axial direction. The application tool T2 includes an attachment member 6 inserted into the rear side of the coupling cylinder 5 and an application portion P attached to the rear end of the attachment member 6. FIG. 12A is a side view illustrating the attachment member 6. FIG. 12B is a side view when the attachment member 6 is viewed in a direction different from that in FIG. 12A. In some examples, the attachment member 6 is formed of polypropylene (PP), and has a cylindrical shape which gradually decreases in diameter from the front side to the rear side. The attachment member 6 includes an insertion portion 6a and an attachment portion 6b. The insertion portion 6a is located on the front side and is insertable into the coupling cylinder 5. The attachment portion 6b extends rearwardly from the insertion portion 6a and has a distal end to which the application portion P is attached.

The insertion portion 6a has a stepped cylindrical shape. The outer surface of the insertion portion 6a has grooves (e.g., a plurality of irregularities) 6c arranged side by side along the circumferential direction and having a knurling tool shape extending in the axial direction, a recess portion 6d positioned on the rear side of the grooves 6c, an annular projection portion 6f protruding from the recess portion 6d and having a tapered surface 6e on the front side, and a flange portion 6g which increases in diameter behind the annular projection portion 6f. The attachment portion 6b includes a large diameter portion 6j having a male screw 6h forming a first one of screw portions 30 for mounting the container 10 on the main body 2, and a small diameter portion 6k extending rearwardly from the large diameter portion 6j and to which the application portion P is attached.

Both the large diameter portion 6j and the small diameter portion 6k have a cylindrical shape extending in the axial direction. An enlarged diameter portion 6r which increases in diameter from the outer surface of the attachment member 6 having the male screw 6h is positioned in front of the male screw 6h of the large diameter portion 6j. The enlarged diameter portion 6r is positioned on the rear side of the flange portion 6g. The flange portion 6g protrudes outwardly in a radial direction further than the enlarged diameter portion 6r. For example, the height protruding outwardly in the radial direction of the enlarged diameter portion 6r is lower than the height protruding outward in the radial direction of the flange portion 6g. An inclined surface 6m which gradually decreases in diameter from the large diameter portion 6j toward the small diameter portion 6k is positioned between the large diameter portion 6j and the small diameter portion 6k.

The inclined surface 6m has an arc-shaped first bent portion 6n having a arc center inside in the radial direction of the attachment member 6, an inclined portion 6p located on a side opposite to the large diameter portion 6*j* of the first bent portion 6*n* and having a surface inclined with respect to the axial direction, and an arc-shaped second bent portion 6*q* having an arc center outside in the radial direction of the attachment member 6. The first bent portion 6*n*, the inclined portion 6*p*, and the second bent portion 6*q* are positioned respectively from the large diameter portion 6*j* toward the small diameter portion 6*k*. An inclination surface angle of the inclined portion 6*p* with respect to the axial direction is 36°, for example.

As illustrated in FIGS. 2 and 5, the attachment member 6 has an internal space 6*v* to accommodate a stirring member S for stirring the application material A. In some examples, the stirring member S may include Steel Use Stainless (SUS). However, the material may include a resin, and can be appropriately changed. The stirring member S is accommodated in a portion on the front side from the inclined surface 6*m* on the inner surface of the attachment member 6. In some examples, the stirring member S is a ball, and is formed into a spherical shape. The stirring member S emits sound by moving inside the space 6*v* in accordance with vibrations applied to the application container 1. The small diameter portion 6*k* of the attachment portion 6*b* extends rearwardly from the inclined surface 6*m*. The rear end of the small diameter portion 6*k* has an opening 6*s* into which the application portion P is inserted.

The application portion P has a round bar shape, and has an inclined surface P1 in one end in the longitudinal direction. The inclined surface P1 is positioned in the rear end of the main body 2, and is inclined to form an acute angle with respect to the axial direction. In some examples, the inclined surface P1 has a flat shape. The application portion P has a large diameter portion P2 having the inclined surface P1 and a small diameter portion P3 extending forward from the large diameter portion P2. The small diameter portion P3 is inserted into the opening 6*s* of the attachment member 6. The outer surface of the small diameter portion P3 has an annular projection portion P5 which causes the application portion P to engage with the attachment member 6 and which has a tapered surface on the front side. In the application portion P, the small diameter portion P3 is inserted into the opening 6*s* of the attachment member 6 from the rear side, and the annular projection portion P5 rides over the annular projection portion inside the opening 6*s* to engage with the attachment member 6 in the axial direction. The container 10 containing the application material A is attached to the attachment member 6.

Figure 13:
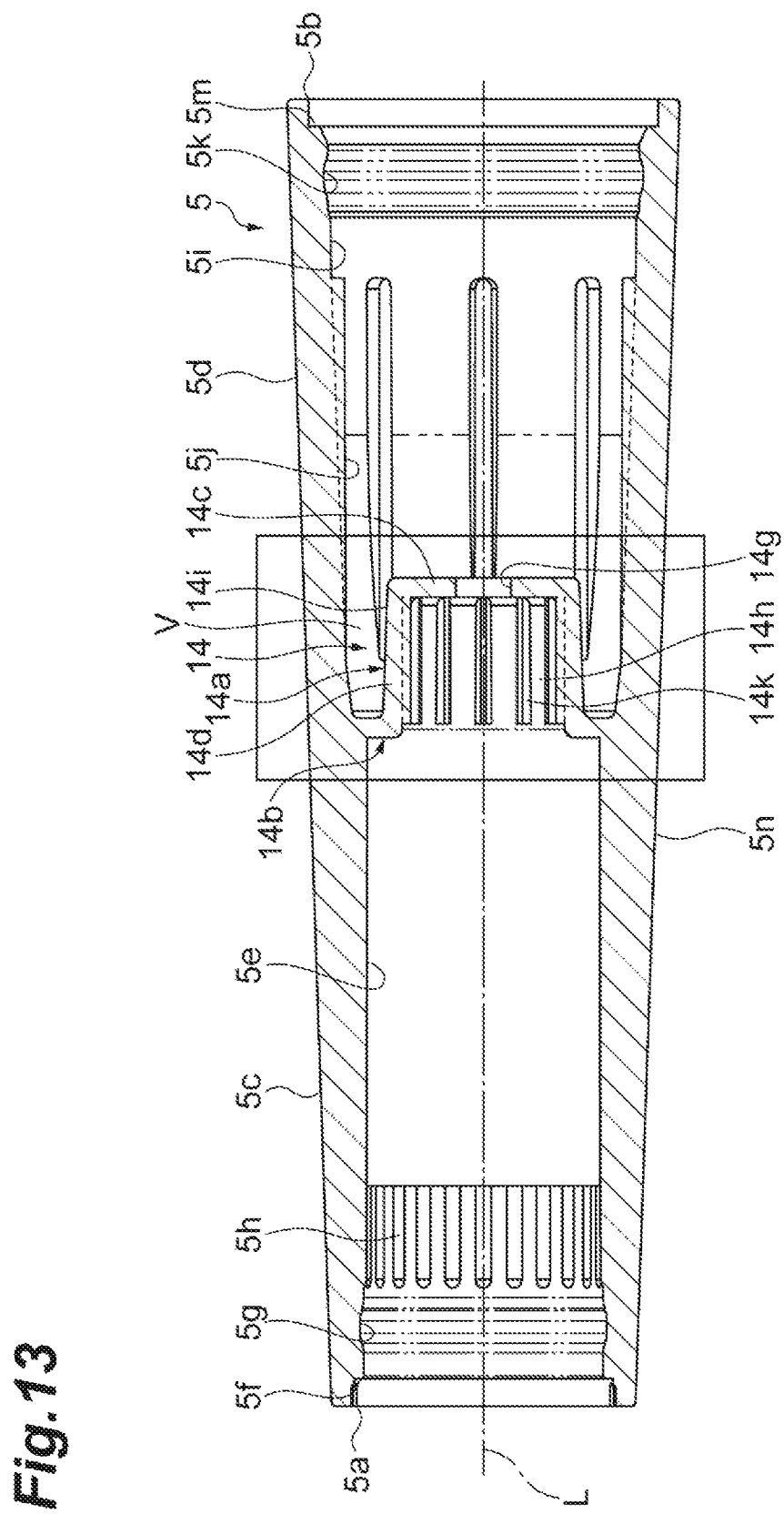
FIG. 13 is a longitudinal sectional view of a coupling cylinder of the application container illustrated in FIG. 5.
Figure 14:
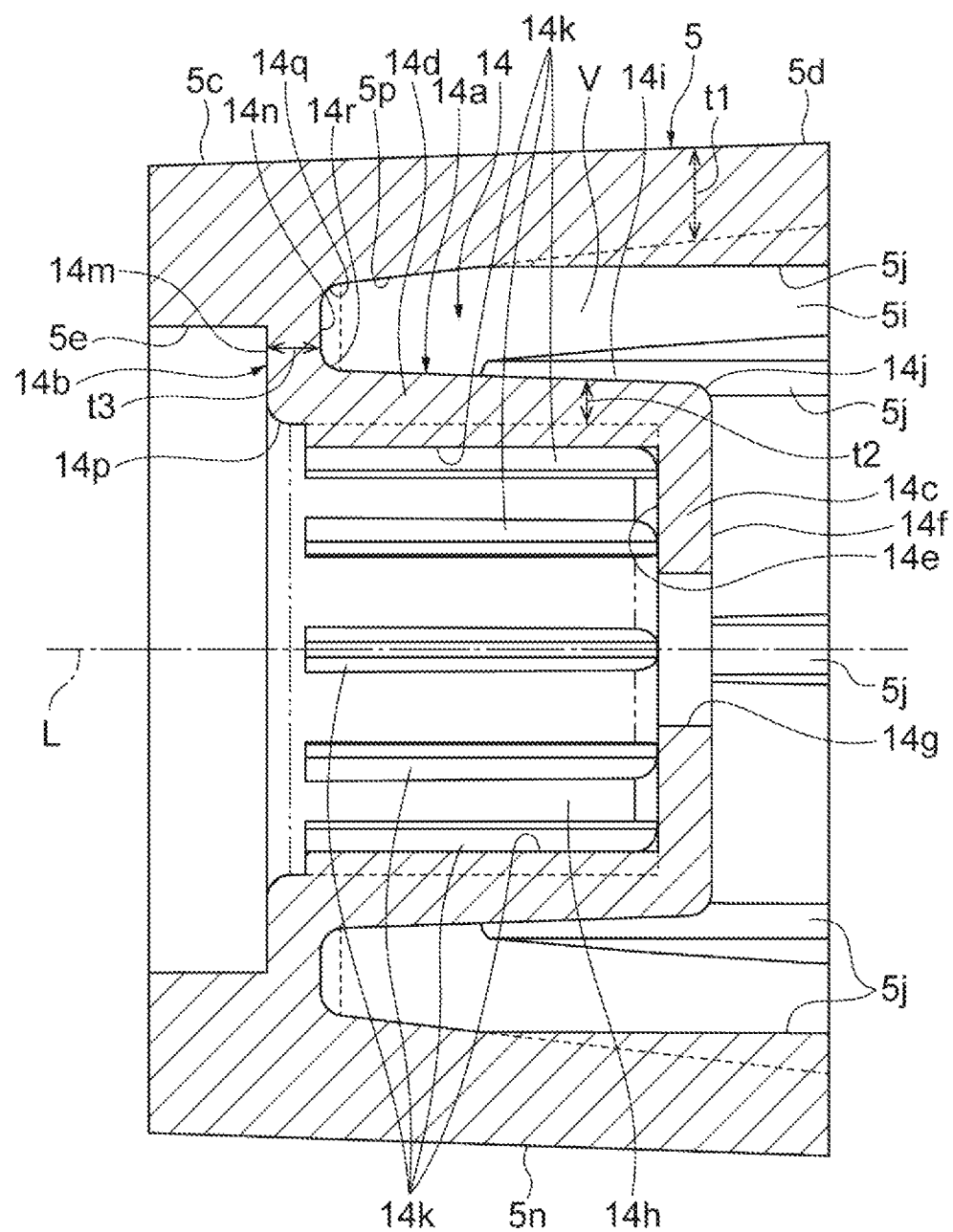
FIG. 14 is an enlarged sectional view of an engagement portion of the coupling cylinder illustrated in FIG. 13.

FIG. 13 is a longitudinal sectional view illustrating the coupling cylinder 5. FIG. 14 is an enlarged a sectional view illustrating the engagement portion 14 of the coupling cylinder 5 in FIG. 13. The coupling cylinder 5 is a cylindrical member for connecting the application tool T1 to the application tool T2. In some examples, the coupling cylinder 5 comprises an Acrylonitrile Butadiene Styrene (ABS) resin, and is formed in a cylindrical shape extending in the axial direction around the axis L serving as a central axis.

Openings 5*a* and 5*b* are formed at the front end and rear end of the coupling cylinder 5 in the axial direction. Each of the openings 5*a* and 5*b* when viewed in the axial direction has a circular shape centered on the axis L, and the inner diameter of the opening 5*b* is larger than the inner diameter of the opening 5*a*. The opening 5*a* is formed in the front end of the coupling cylinder 5, and the opening 5*b* is formed in the rear end of the coupling cylinder 5. The application tool T1 is positioned inside the opening 5*a*, and the application tool T2 is positioned inside the opening 5*b*.

The engagement portion 14 is located near the center in the axial direction inside the coupling cylinder 5. The coupling cylinder 5 has a front side portion 5*c* located on the front side from the engagement portion 14 and a rear side portion 5*d* located on the rear side from the engagement portion 14. The front side portion 5*c* of the coupling cylinder 5 accommodates the holding member 8 and the middle cylinder 4 of the application tool T1, and the rear side portion 5*d* accommodates the attachment member 6 of the application tool T2. The inner surface 5*e* of the front side portion 5*c* has a step 5*f*, an annular recess portion 5*g* and ridges 5*h* (e.g., irregularities). The step 5*f* increases in diameter toward the front end of the front side portion 5*c*, and is located at the front end portion of the inner surface 5*e*. The annular recess portion 5*g* extends in the circumferential direction of the inner surface 5*e* behind the step 5*f*. The ridges 5*h* are formed behind the annular recess portion 5*g*. The ridges 5*h* extend in the axial direction and are spaced apart along the circumference of the inner surface 5*e*. For example, the ridges 5*h* may be arranged side by side along the circumferential direction, and have a knurling tool shape extending in the axial direction.

The inner surface 5*i* of the rear side portion 5*d* of the coupling cylinder 5 has a larger diameter (e.g. a more increased diameter) than the inner surface 5*e* of the front side portion 5*c*. The inner surface 5*i* of the rear side portion 5*d* has a plurality of ridges 5*j* extending along the axial direction from the front end portion of the inner surface 5*i* and arranged side by side along the circumferential direction, an annular recess portion 5*k* extending in the circumferential direction behind the plurality of ridges 5*j*, and a step 5*m* which increases in diameter toward the rear end of the rear side portion 5*d* behind the annular recess portion 5*k*. The front end portion of the inner surface 5*i* of the rear side portion 5*d* has an inclined surface 5*p* which gradually decreases in diameter from a rear end to a front end of the inclined surface 5*p*.

The outer surface of the coupling cylinder 5 serves as a smooth surface having substantially no surface irregularities (e.g., ridges). Specifically, the outer surface is an inclined surface 5*n* which gradually increases in diameter from the front to the rear. Accordingly, the outer diameter of the inclined surface 5*n* of the rear side portion 5*d* is larger than the outer diameter of the inclined surface 5*n* of the front side portion 5*c*. The thickness (e.g., wall thickness) of the coupling cylinder 5 is substantially constant at each position along the axial direction. In some examples, the average thickness (e.g., average wall thickness) of the coupling cylinder 5 is 0.8 mm to 2.2 mm (1.45 mm in an example). The thickness of the coupling cylinder 5 indicates the thickness (plate thickness) in the radial direction at any position of the coupling cylinder 5. The average thickness of the coupling cylinder 5 indicates the average wall thickness of substantially all positions of the coupling cylinder 5. In FIG. 14, a thickness t1 of the coupling cylinder 5 indicates a thickness (e.g. a wall thickness) of a portion facing the engagement portion 14 in the coupling cylinder 5.

In the coupling cylinder 5 configured as described above, as illustrated in FIGS. 2 and 5, a rear side portion than the front side cylindrical portion 4*a* of the middle cylinder 4 is inserted into the front side portion 5*c* from the front side. The annular projection 4*j* of the middle cylinder 4 engages with the annular recess portion 5*g* of the front side portion 5*c* in the axial direction, and the flange portion 4*g* of the middle cylinder 4 is fitted to the step 5*f* of the coupling cylinder 5. The protruding portion 4*k* of the middle cylinder 4 engages with the ridges 5*h* in the rotation direction of the coupling cylinder 5. The protruding portion 4k engages with the ridges 5h in the rotation direction, thereby causing the middle cylinder 4 to engage with the coupling cylinder 5 to be synchronously rotatable therewith. The flange portion 8b of the holding member 8 is interposed between the engagement portion 14 (specifically, the connector 14b to be described later) and the rear end of the middle cylinder 4 inside the front side portion 5c. In this manner, the holding member 8 engages with the coupling cylinder 5 in the axial direction. The flange portion 8b of the holding member 8 is pressed by the middle cylinder 4. The holding member 8 may be movable forward as much as a compressed amount of the spring portion 4c of the middle cylinder 4.

The insertion portion 6a of the attachment member 6 is inserted into the rear side portion 5d from the rear side. The grooves 6c positioned on the outer surface of the insertion portion 6a engage with the ridge 5j of the coupling cylinder 5 in the rotation direction. The annular projection portion 6f positioned on the outer surface engages with the annular recess portion 5k of the coupling cylinder 5 in the axial direction. The flange portion 6g of the attachment member 6 is fitted into the step 5m of the coupling cylinder 5. The plurality of grooves 6c engage with the ridge 5j in the rotation direction, and the annular projection portion 6f engages with the annular recess portion 5k in the axial direction. In this manner, the attachment member 6 engages with the coupling cylinder 5 to be immovable in the axial direction and non-rotatable.

As illustrated in FIGS. 13 and 14, the engagement portion 14 is a partition wall which internally partitions the coupling cylinder 5, and is formed integrally with the coupling cylinder 5. The engagement portion 14 has a cylindrical portion 14a having a bottomed cylindrical shape having an opening on the front side in the axial direction and a connector 14b (e.g. a bridge) for connecting the cylindrical portion 14a and the coupling cylinder 5 to each other. The cylindrical portion 14a extends rearwardly from the front end portion of the rear side portion 5d. The central axis of the cylindrical portion 14a is located on the axis L. For example, the central axis of the cylindrical portion 14a coincides with the central axis of the coupling cylinder 5.

The cylindrical portion 14a has a bottom wall 14c located in a rear end of the cylindrical portion 14c and a side wall 14d extending forward from a peripheral edge of the bottom wall 14c. The bottom wall 14c includes an inner wall surface 14e facing inward of the cylindrical portion 14a, an outer wall surface 14f facing a side opposite to the inner wall surface 14e, a though-hole 14g penetrating the inner wall surface 14e and the outer wall surface 14f in the axial direction. Each of the inner wall surface 14e and the outer wall surface 14f is flat shape extending along a plane intersecting (in an example, orthogonal to) the axial direction. Each shape of the inner wall surface 14e and the outer wall surface 14f when viewed in the axial direction is an annular shape centered on the axis L. The though-hole 14g is positioned in the central portion of the bottom wall 14c. A shape of the though-hole 14g when viewed in the axial direction is a circular shape centered on the axis L.

The side wall 14d includes an inner peripheral surface 14h facing inward of the cylindrical portion 14a and an outer peripheral surface 14i facing a side opposite to the inner peripheral surface 14h. The inner peripheral surface 14h is formed in a cylindrical hole shape having the axis L serving as the central axis. The inner peripheral surface 14h extends forward from a peripheral edge of the inner wall surface 14e of the bottom wall 14c, and is substantially perpendicular to the inner wall surface 14e. The outer peripheral surface 14i extends along the inner peripheral surface 14h, and specifically, is an inclined surface which gradually decreases rearwardly in diameter. That is, the outer peripheral surface 14i is a surface inclined rearwardly inward in the radial direction of the cylindrical portion 14a. The outer peripheral surface 14i is connected to the outer wall surface 14f of the bottom wall 14c via a bent surface 14j located in a rear end of the outer peripheral surface 14i. The bent surface 14j is bent inward in the radial direction from the outer peripheral surface 14i, is connected to the outer wall surface 14f, and has a rounded shape.

The outer peripheral surface 14i is separated from the inner surface 5i of the rear side portion 5d in the radial direction, and faces the inner surface 5i in the radial direction. The outer peripheral surface 14i is spaced apart from (e.g., separated from) the inner surface 5i in the radial direction, thereby forming a space V between the outer peripheral surface 14i and the inner surface 5i. The space V is an annular internal space surrounding the cylindrical portion 14a in the circumferential direction inside the rear side portion 5d. The front end portion of the space V decreases forwardly in diameter.

The inner peripheral surface 14h has ridges (e.g., a plurality of irregularities) 14k extending in the axial direction and spaced apart along the circumferential direction and having a knurling tool shape. In some examples, the ridges 14k are spaced apart on the inner peripheral surface 14h at substantially equal intervals along the circumferential direction.

The thickness (e.g., wall thickness) of the cylindrical portion 14a is substantially constant at each position of the cylindrical portion 14a. The wall thickness of the cylindrical portion 14a includes the thickness of the side wall 14d in the radial direction and the thickness of the bottom wall 14c in the axial direction. The thickness of the side wall 14d in the radial direction may indicate a distance in the radial direction between the inner peripheral surface 14h and the outer peripheral surface 14i. The thickness of the bottom wall 14c in the axial direction may indicate a distance in the axial direction between the inner wall surface 14e and the outer wall surface 14f. In FIG. 14, a wall thickness t2 of the cylindrical portion 14a indicates a thickness of the side wall 14d facing the rear side portion 5d of the coupling cylinder 5. The thickness of the bottom wall 14c is constant at each position in the radial direction.

The connector (or bridge) 14b connects a boundary portion between the inner surface 5e and the inner surface 5i in the coupling cylinder 5 and the front end portion of the cylindrical portion 14a to each other, and extends along the radial direction. The connector 14b has a front end having a front end surface 14m and a rear end surface 14n located on a side opposite to the front end surface 14m. The front end surface 14m is forming to be substantially perpendicular to the inner surface 5e of the front side portion 5c, and extends along a plane intersecting (for example, orthogonal to) the axial direction. The front end surface 14m is connected to the inner peripheral surface 14h of the cylindrical portion 14a via a bent surface 14p located in the front end of the cylindrical portion 14a. The bent surface 14p is a surface bent in each of the axial direction and the radial direction, and connects the front end surface 14m and the inner peripheral surface 14h to each other.

A rear end surface 14n of the connector 14b extends along the front end surface 14m. In some examples, the space V is formed by the inner surface 5i of the rear side portion 5d, the inclined surface 5p located forward of the inner surface 5i, the bent surface 14q bent forward from the inclined surface 5*p*, the rear end surface 14*n*, the bent surface 14*r* bent rearward from the rear end surface 14*n*, and the outer peripheral surface 14*i* of the cylindrical portion 14*a*. The bent surface 14*q* is a surface bent in each of the axial direction and the radial direction, and smoothly connects the rear end surface 14*n* and the inclined surface 5*p* to each other. The bent surface 14*r* is a surface bent along the bent surface 14*p*, and smoothly connects the rear end surface 14*n* and the outer peripheral surface 14*i* to each other.

The wall thickness of the connector 14*b* is substantially constant at each position along the radial direction. The average thickness (or average wall thickness) of the connector 14*b* is set to be smaller than the average wall thickness of the coupling cylinder 5. The wall thickness of the connector 14*b* may indicate a thickness in the axial direction at any position of the connector 14*b*, for example, a distance in the axial direction between the front end surface 14*m* and the rear end surface 14*n*. The average wall thickness of the connector 14*b* may indicate an average value of the thickness at substantially all positions of the connector 14*b*. In FIG. 14, a wall thickness t3 of the connector 14*b* indicates a wall thickness near the center in the radial direction of the connector 14*b*.

In some examples, a ratio of the average wall thickness of the connector 14*b* to the average wall thickness of the coupling cylinder 5 is set to 30% to 60%, and may be set to 45% to 50% (as an example, 48.3%). In some examples, the average thickness of the connector 14*b* is 0.5 mm to 0.8 mm (as an example, 0.7 mm).

In the example engagement portion 14 illustrated in FIGS. 2 and 5, the rear side cylindrical portion 8*c* of the holding member 8 is inserted into the cylindrical portion 14*a* of the engagement portion 14 from the front side, and the rear side cylindrical portion 8*c* faces the bottom wall 14*c* of the cylindrical portion 14*a* in the axial direction. The elastic protruding portion 8*e* positioned in the rear side cylindrical portion 8*c* engages with the ridges 14*k* positioned in the inner peripheral surface 14*h*, in the rotation direction. The elastic protruding portion 8*e* engages with the ridges 14*k* in the rotation direction. In this manner, the holding member 8 engages with the coupling cylinder 5 around the axis L in the rotation direction. The elastic protruding portion Se and the ridges 14*k* disengage from each other when the rotational force (torque) of the application tool T1 which is applied to the coupling cylinder 5 has a value that exceeds a threshold value.

As illustrated in FIG. 2, the example container 10 has a cylindrical shape extending in the axial direction. The container 10 is attached to the opening 5*b* (refer to FIG. 13) on the rear side of the coupling cylinder 5 via the attachment member 6. The container 10 includes a bottomed cylindrical filling unit 11 filled with the application material A, a cover 12 surrounding the filling unit 11 and attached to the attachment member 6, an application portion P, and a soft material-made wiper 13 to wipe off an excess of the application material adhering to the application portion P and the small diameter portion 6*k* of the attachment member 6 by drawing in the small diameter portion 6*k*.

Figure 15:
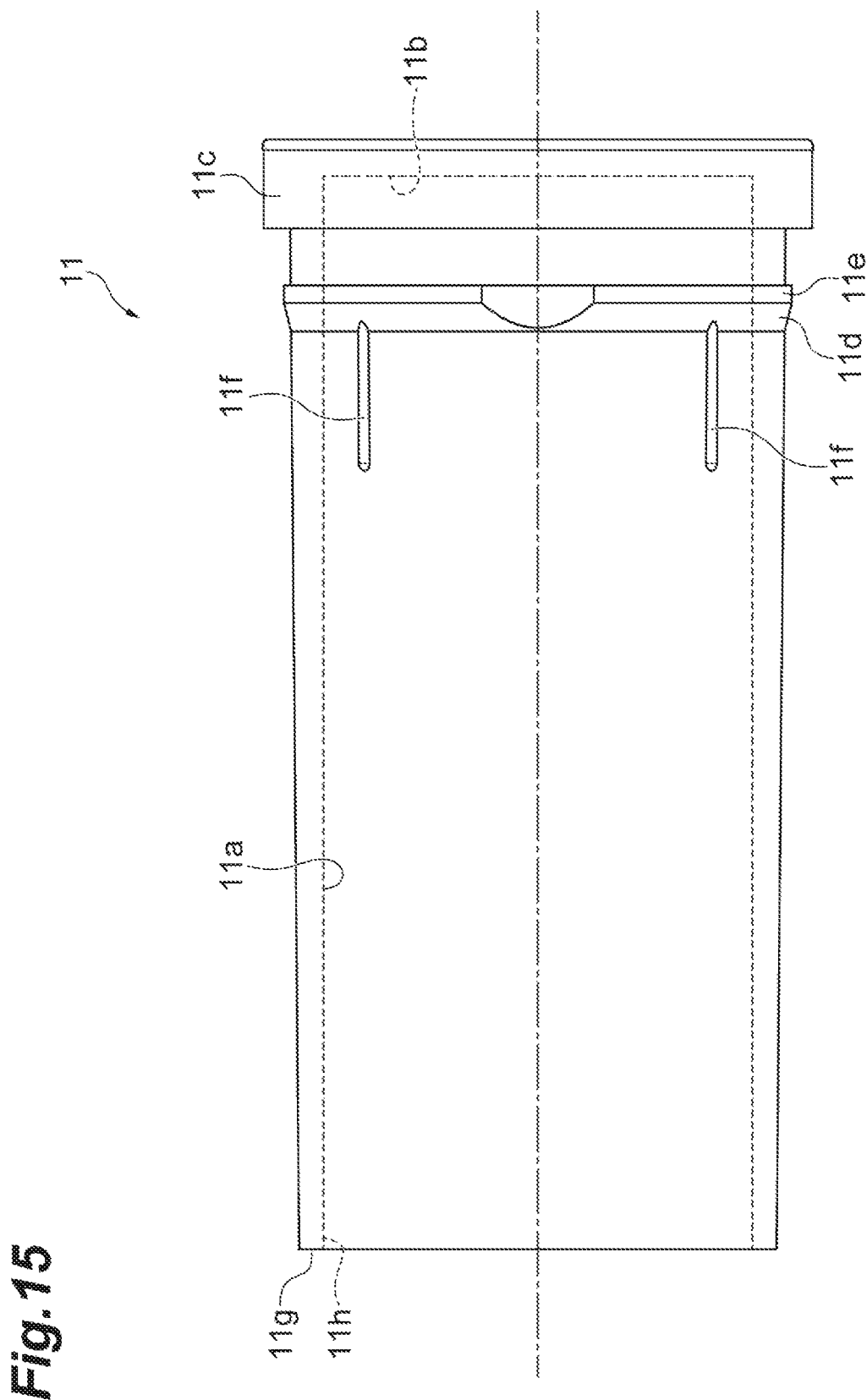
FIG. 15 is a side view of a filling unit of the application container illustrated in FIG. 2.

FIG. 15 is a side view illustrating the filling unit 11. For example, the filling unit 11 may include polypropylene(PP). As illustrated in FIG. 15, the filling unit 11 is formed in a bottomed cylindrical shape. The inner surface of the filling unit 11 is substantially smooth (e.g. substantially free of any ridges, surface pattern or irregularities), and serves as a smooth surface. The inner surface of the filling unit 11 is configured to include an inner surface 11*a* smoothly bent in a cylindrical tube shape, and a flat bottom surface 11*b* located in the rear end of the inner surface 11*a*.

The front side of the outer surface of the filling unit 11 is substantially smooth (e.g., free of any ridges, surface pattern or irregularities), and serves as the smooth surface. The filling unit 11 has an opening 11*h* into which the wiper 13 is inserted at one end 11*g* on the front side. The rear side of the outer surface of the filling unit 11 includes an enlarged diameter portion 11*c* protruding outwardly in the radial direction in the rear end of the filling unit 11, an annular projection portion 11*e* located forward of the enlarged diameter portion 11*c* and having a tapered surface 11*d* on the front side, and a plurality of projection portions 11*f* extending forward in the axial direction from the tapered surface 11*d*. The rear end of the enlarged diameter portion 11*c* is slightly rounded. For example, the filling unit 11 has four projection portions 11*f*. The four projection portions 11*f* are positioned at substantially equal intervals in the circumferential direction. For example, a protruding shape of the projection portion 11*f* is an arc shape.

Figure 16B:
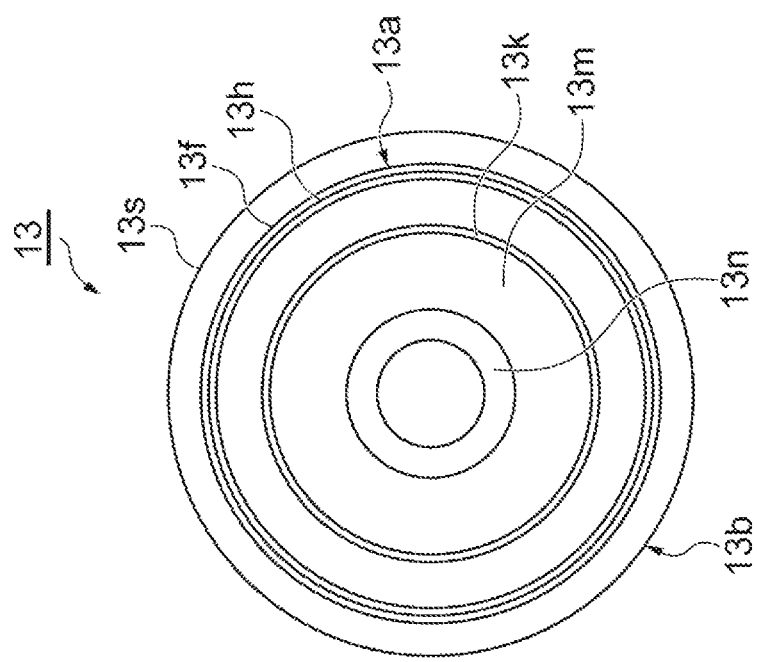
FIG. 16B is a rear side view of the wiper illustrated in FIG. 16A.
Figure 16A:
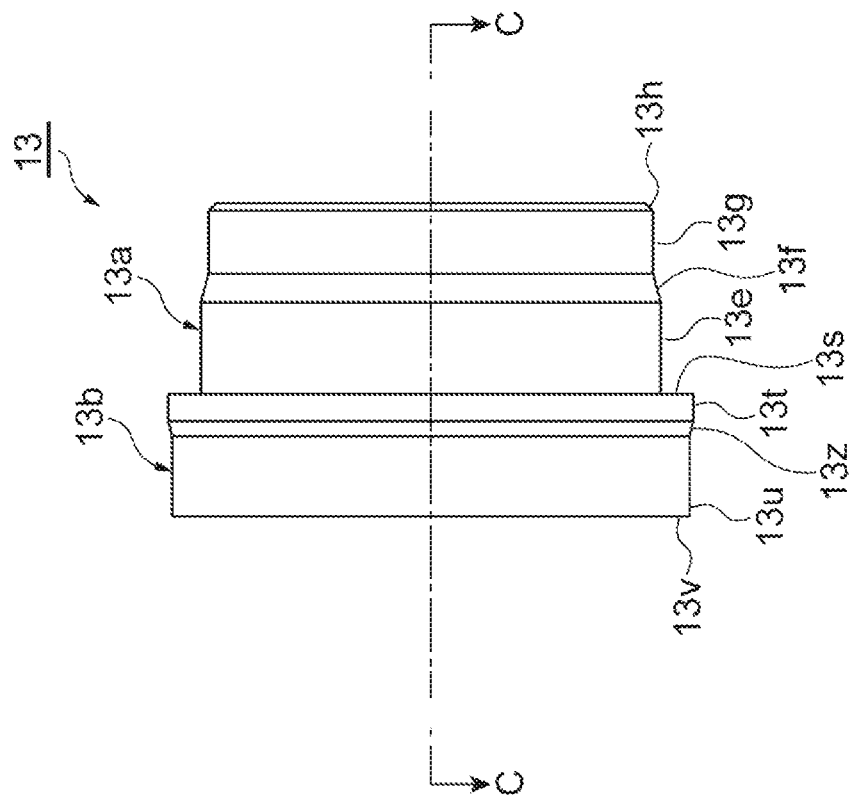
FIG. 16A is a side view of a wiper of the application container illustrated in FIG. 2.
Figure 17:
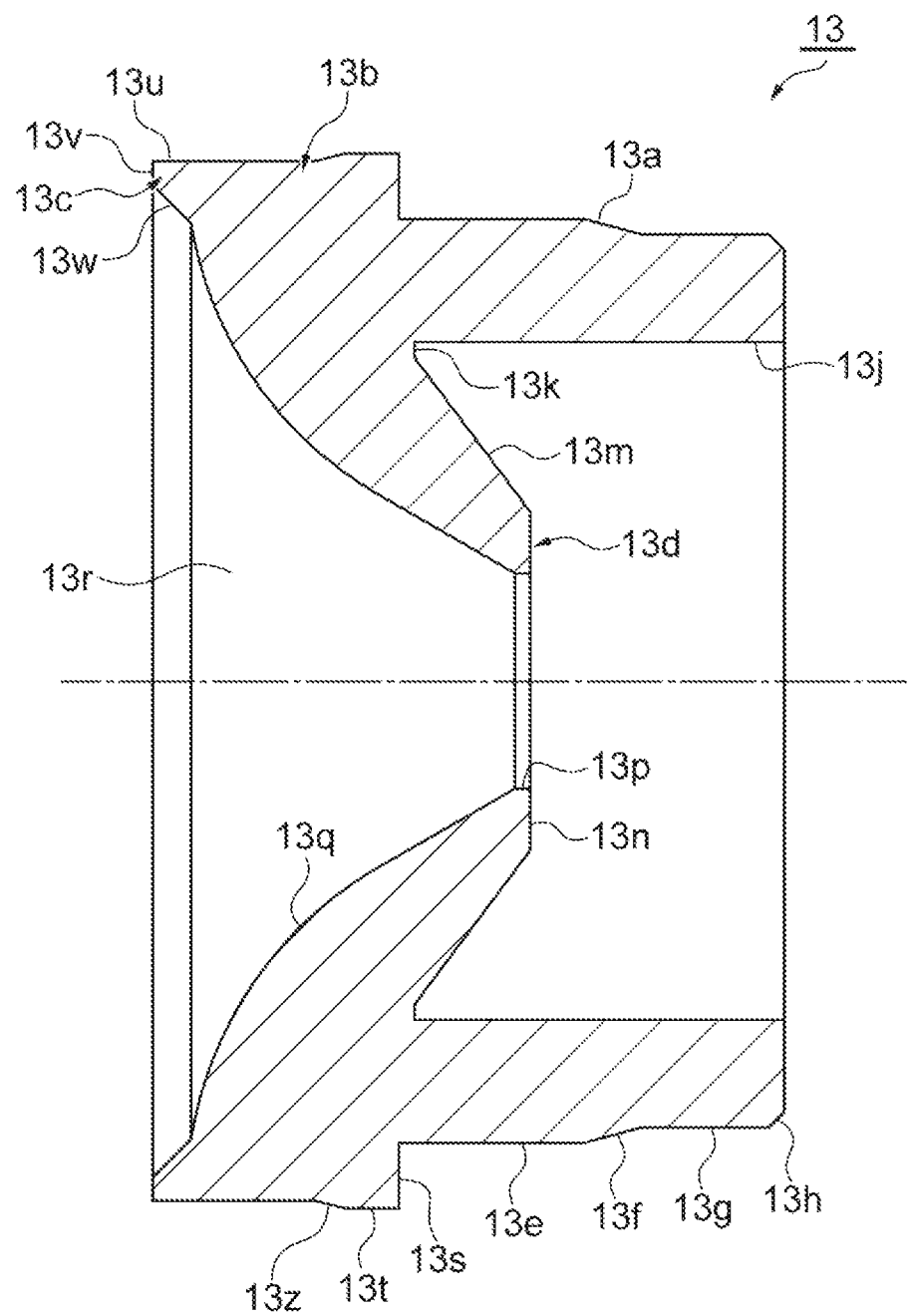
FIG. 17 is a sectional view of the wiper illustrated in FIG. 16A, taken along line C-C.

FIG. 16A is a side view illustrating the wiper 13. FIG. 16B is a view when the wiper 13 is viewed from the rear side. FIG. 17 is a sectional view taken along line C-C illustrated in FIG. 16A. The wiper 13 is formed of a rubber material. For example, with regard to hardness of the wiper 13, hardness in accordance with a type A durometer regulated in JIS 6253 (method of obtaining hardness of vulcanized rubber and thermoplastic rubber) is set to 40 to 80 (as an example, 60).

In some examples, as illustrated in FIG. 16A, FIGS. 16B, and 17, the wiper 13 has a stepped cylindrical shape. The wiper 13 includes a cylindrical extension portion 13*a* extending rearwardly, a first protruding portion 13*b* protruding outwardly in the radial direction in the front end of the extension portion 13*a*, a second protruding portion 13*c* further protruding forward from the front end of the first protruding portion 13*b*, and a drawing portion 13*d* protruding inwardly in the radial direction from the extension portion 13*a* and the first protruding portion 13*b*.

The extension portion 13*a* has a first side surface 13*e* extending in the axial direction from the rear end of the first protruding portion 13*b*, a first tapered surface 13*f* inclined inwardly in the radial direction of the wiper 13 from the rear end of the first side surface 13*e*, a second side surface 13*g* extending in the axial direction from the rear end of the first tapered surface 13*f*, and a second tapered surface 13*h* inclined inward in the radial direction of the wiper 13 from the rear end of the second side surface 13*g*. The rear end of the second tapered surface 13*h* corresponds to the rear end of the wiper 13.

The wiper 13 has a through-hole 13*r* into which the application portion P and the attachment member 6 are insertable, and the through-hole 13*r* penetrates the wiper 13 in the axial direction. The inner surface of the extension portion 13*a* of the wiper 13 is configured to include an inner peripheral surface 13*j* smoothly bent in a cylindrical tube shape, and the drawing portion 13*d* protruding inward in the radial direction from the front end of the inner peripheral surface 13*j*. The drawing portion 13*d* includes a planar portion 13*k* located in the front end of the inner peripheral surface 13*j*, a first extension portion 13*m* extending from an end portion inside in the radial direction of the planar portion 13*k*, an annular portion 13*n* located in the rear end of the first extension portion 13*m*, an inner peripheral surface 13*p* extending forward from the annular portion 13*n*, and a bent portion 13*q* extending toward the first protruding portion 13*b* from the front end of the inner peripheral surface 13*p*.

The planar portion 13k extends inward in the radial direction from the front end of the inner peripheral surface 13j. The first extension portion 13m is inclined rearwardly inward in the radial direction from an end portion inside in the radial direction of the first planar portion 13k. The annular portion 13n is formed in a flat shape in the rear end of the first extension portion 13m. The inner peripheral surface 13p extends forward from an end portion inside in the radial direction of the annular portion 13n. The bent portion 13q extends to the first protruding portion 13b from the front end of the inner peripheral surface 13p, and is bent forward and outward in the radial direction so that the drawing portion 13d bulges. The application portion P and the attachment member 6 which are to be inserted into the through-hole 13r contact the bent portion 13q and the inner peripheral surface 13p, and move rearward. The attachment member 6 and the application portion P which are drawn forward from the through-hole 13r are drawn while both of these mainly come into contact with the inner peripheral surface 13p. In this manner, both of these are drawn by the wiper 13.

The first protruding portion 13b has a protruding surface 13s extending outward in the radial direction from the front end of the extension portion 13a, an outer peripheral surface 13t extending forward from an end portion of the protruding surface 13s outside in the radial direction, and a tapered surface 13z which decreases in diameter from the front end of the outer peripheral surface 13t. The second protruding portion 13c has a protruding surface 13u extending forward, an annular surface 13v extending inward in the radial direction from the front end of the protruding surface 13u, and an inclined surface 13w extending rearward from an end portion inside in the radial direction of the annular surface 13v and inclined inwardly in the radial direction.

Figure 18A:
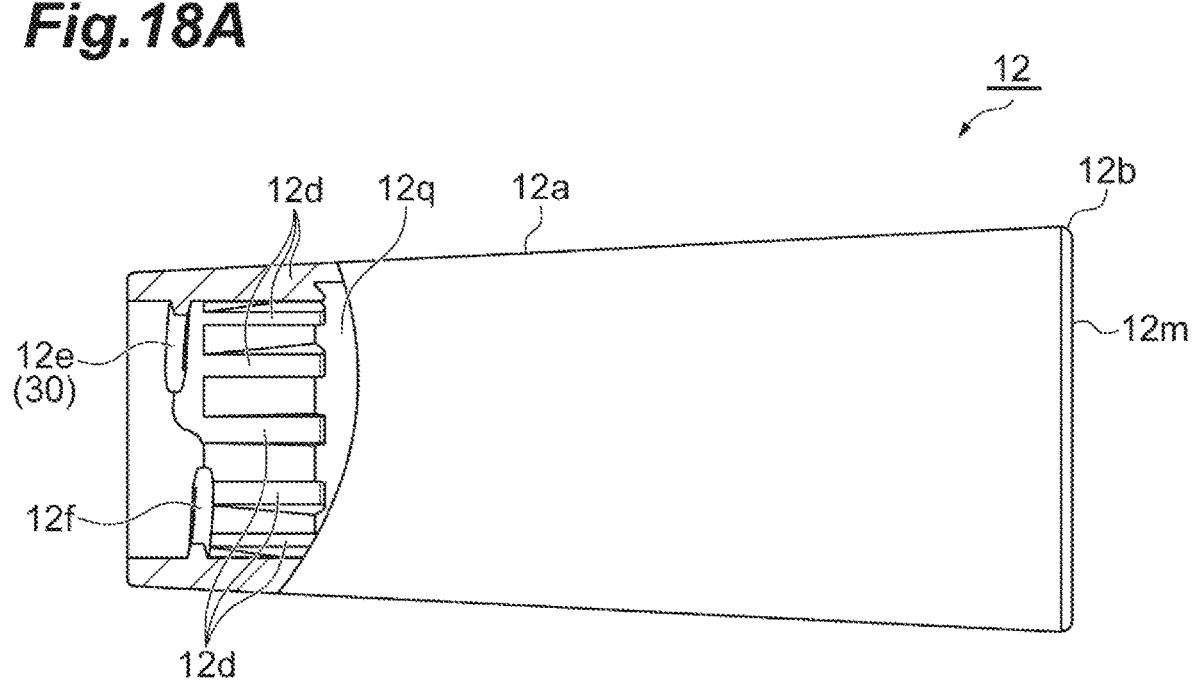
FIG. 18A is a partial sectional view of a cover of the application container illustrated in FIG. 2.
Figure 18B:
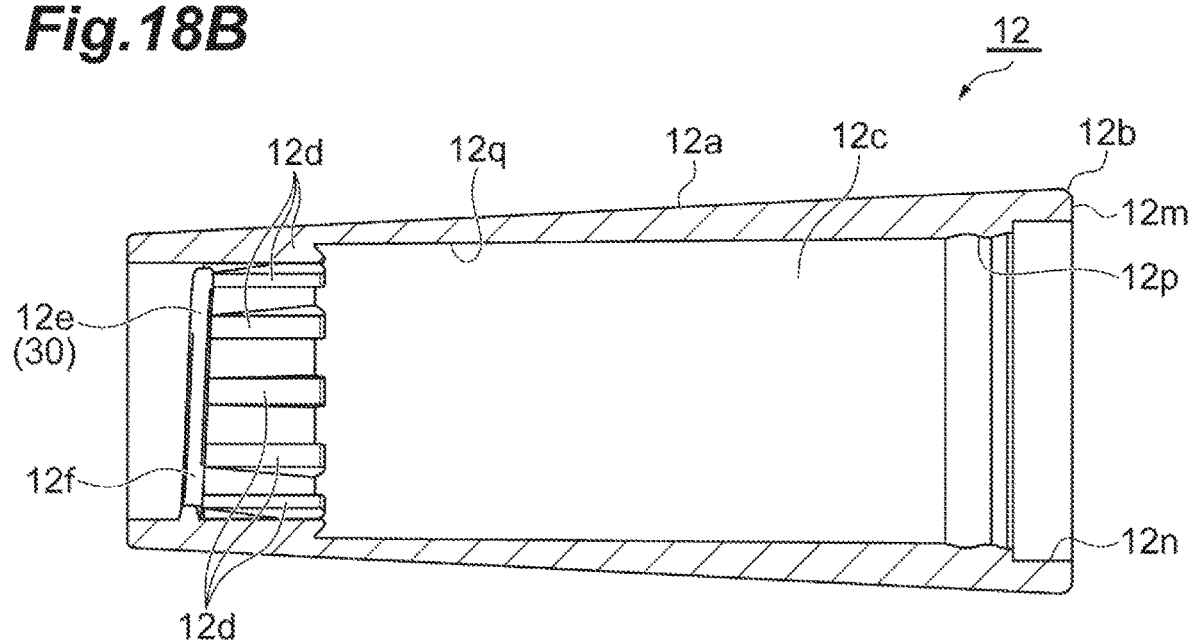
FIG. 18B is a longitudinal sectional view of the cover illustrated in FIG. 18A, taken along a plane that includes a center axis of the cover.

FIG. 18A is a partial sectional view illustrating the cover 12. FIG. 18B is a longitudinal sectional view when the cover 12, taken along a plane including the center axis L (ref FIG. 5). The cover 12 has a cylindrical shape, and includes an Acrylonitrile Butadiene Styrene (ABS) resin, for example. In some examples, the cover 12 has a cylindrical shape. The outer surface of the cover 12 serves as a smooth surface (e.g., having substantially no ridges, surface pattern or irregularities), and is an inclined surface 12a which is inclined with respect to the axial direction. The outer diameter of the inclined surface 12a of the cover 12 is larger than the outer diameter of the inclined surface 5n of the coupling cylinder 5. For example, the outer diameter of the front end of the inclined surface 12a may be approximately the same as the outer diameter of the rear end of the inclined surface 5n, and the inclined surface 12a may gradually increase in diameter rearwardly from the front end. That is, the inclined surface 12a is inclined rewardly outward in the radial direction of the cover 12 from the front end. The rear end (e.g., rear end of the cover 12) of the inclined surface 12a has a rounded bent portion 12b which is bent inward in the radial direction from the inclined surface 12a.

The rear side of the inner surface 12q of the cover 12 has an annular recess portion 12n extending forward from the rear end 12m of the cover 12, and an annular irregular portion 12p located on the front side of the annular recess portion 12n. The vicinity at the center of the inner surface 12q of the cover 12 in the axial direction serves as a smooth surface 12c (e.g. having substantially no ridges, surface pattern or irregularities). An inclination angle of the inner surface 12q with respect to the axial direction is smaller than an inclination angle of the inclined surface 12a with respect to the axial direction. Therefore, a portion having the inclined surface 12a and the inner surface 12q of the cover 12 has a thickness that gradually increases rearwardly.

The front side of the inner surface 12q of the cover 12 has a wall portion 12d protruding inward in the radial direction from the smooth surface 12c, and a female screw 12e positioned in front of the wall portion 12d and forming the second one of the screw portions 30. The female screw 12e is configured to include a spiral projection 12f projecting inward in the radial direction from the inner surface 12q of the cover 12. The cover 12 is mounted on the attachment member 6 by screwing the projection 12f to the male screw 6h configuring one of the screw portions 30.

Figure 19:
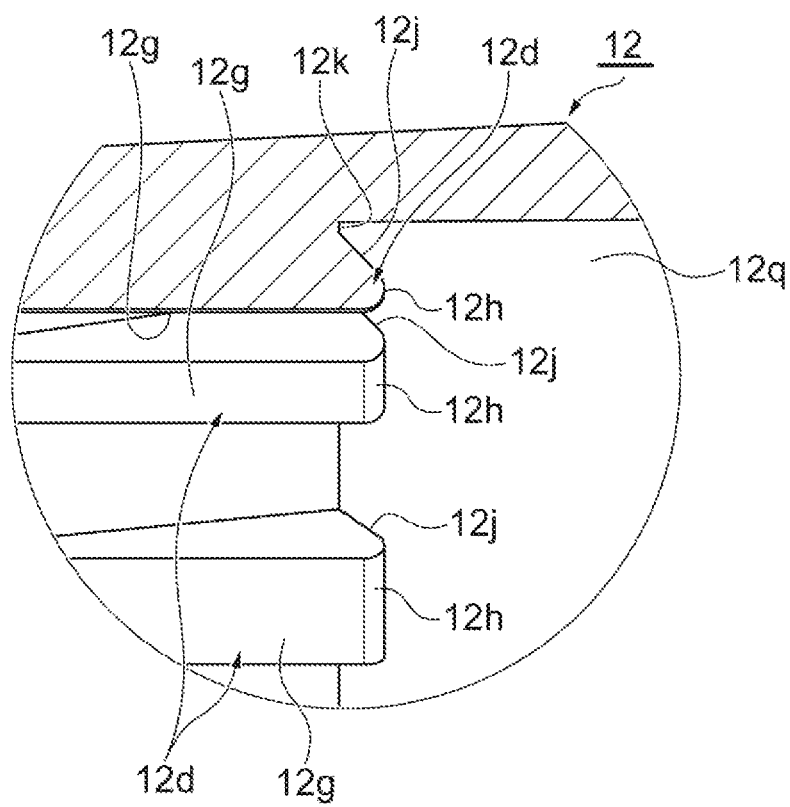
FIG. 19 is an enlarged view of a wall portion of the cover illustrated in FIGS. 18A and 18B.

FIG. 19 is an enlarged view of the wall portion 12d of the cover 12. As illustrated in FIGS. 18A, 18B, and 19, the plurality of wall portions 12d are positioned. For example, the plurality of wall portions 12d are arranged side by side along the circumferential direction of the cover 12. For example, the wall portions 12d may be intermittently formed along the circumferential direction of the cover 12. The wall portion 12d has a top surface 12g protruding inward in the radial direction as the top surface 12g is oriented rearward from the portion having the female screw 12e, a bent portion 12h folded forward and outward in the radial direction from the rear end of the top surface 12g, an inclined surface 12j inclined forwardly outward in the radial direction from the bent portion 12h, and a flat portion 12k extending further outward in the radial direction from an end portion outside in the radial direction of the inclined surface 12j.

In some examples, the plurality of wall portions 12d are arranged at substantially equal intervals in the circumferential direction, and the number of the wall portions 12d is 12. In some examples, the top surface 12g of the wall portions 12d extends along the axis L (ref. FIG. 19), and extends parallel to the axis L, for example. However, the top surface 12g may extend non-parallel to the axis L. For example, the top surface 12g may be inclined in a direction away from the axis as the top surface 12g is oriented rearward.

Figure 20A:
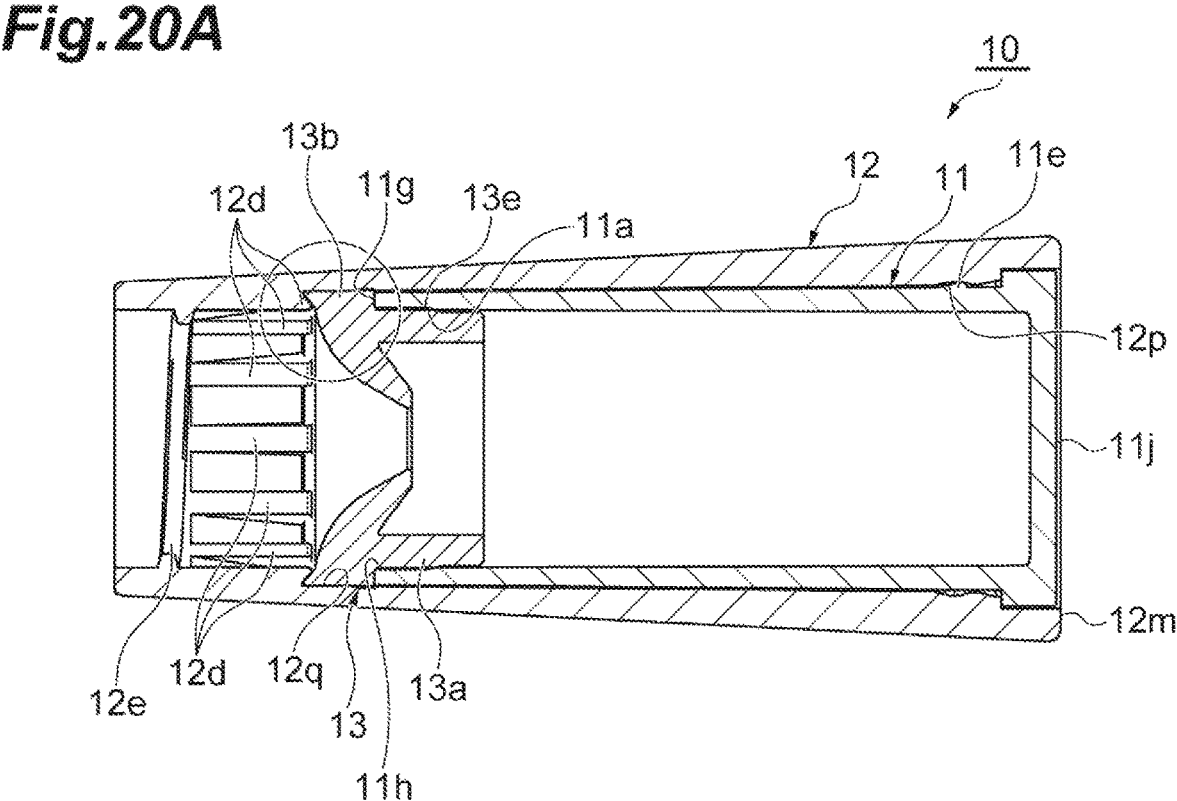
Figure 20B:
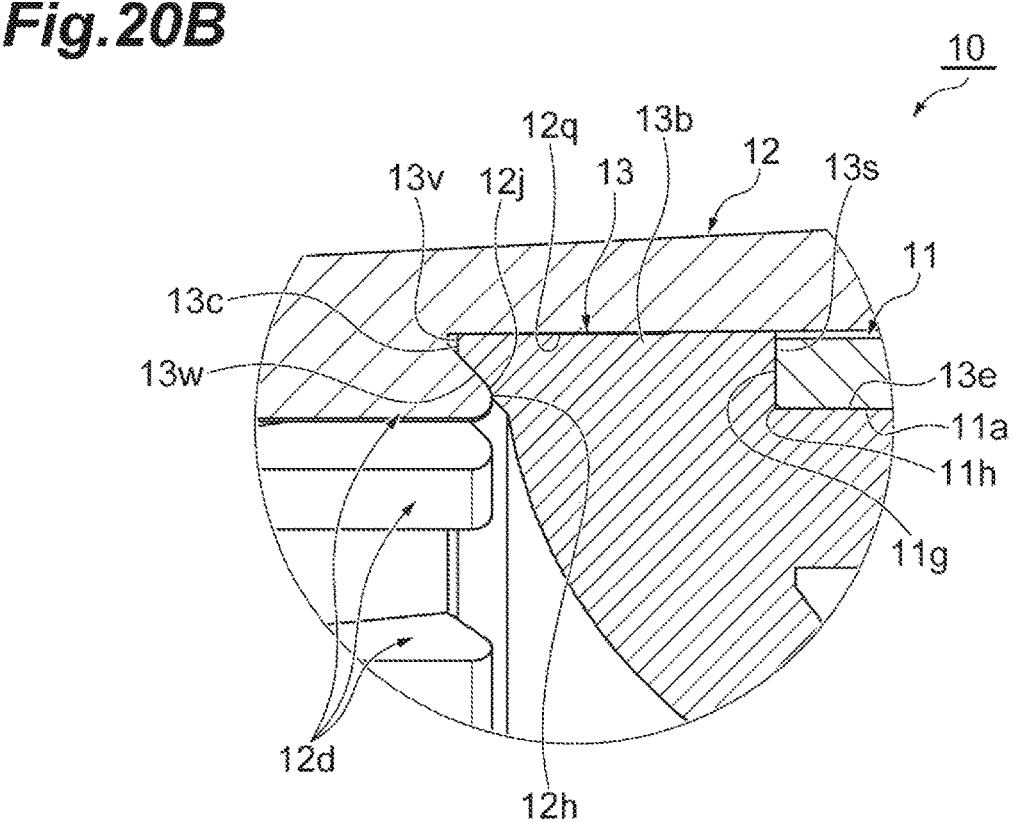
FIG. 20B is an enlarged sectional view illustrating the wiper interposed between the filling unit and the wall portion of the cover illustrated in FIG. 20A.
Figure 21A:
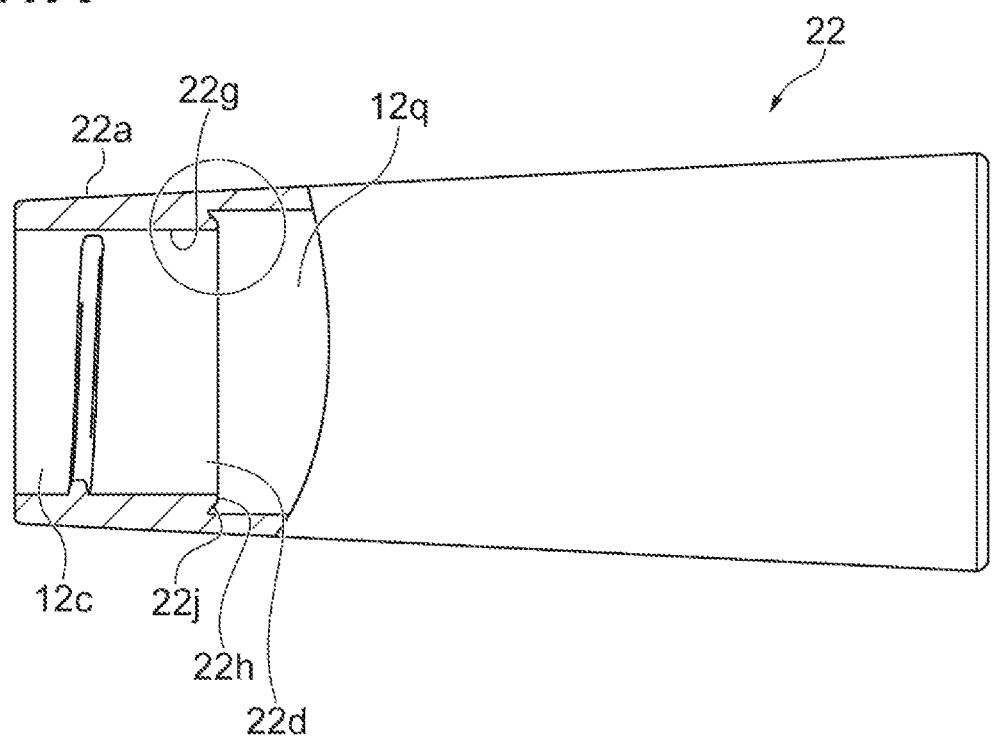
FIG. 21A is a partial sectional view of a cover of an application container according to a first modification example.
Figure 21B:
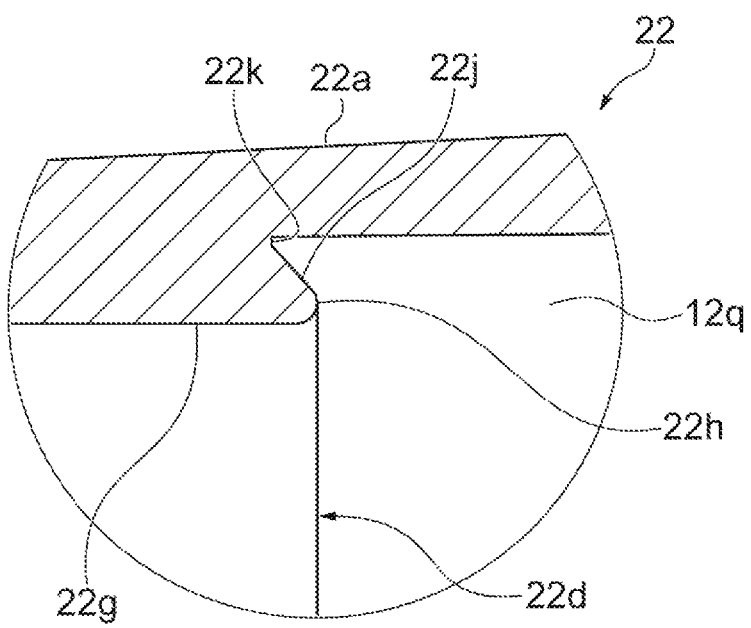
FIG. 21B is an enlarged sectional view illustrating a wall portion of the cover illustrated in FIG. 21A.
Figure 22A:
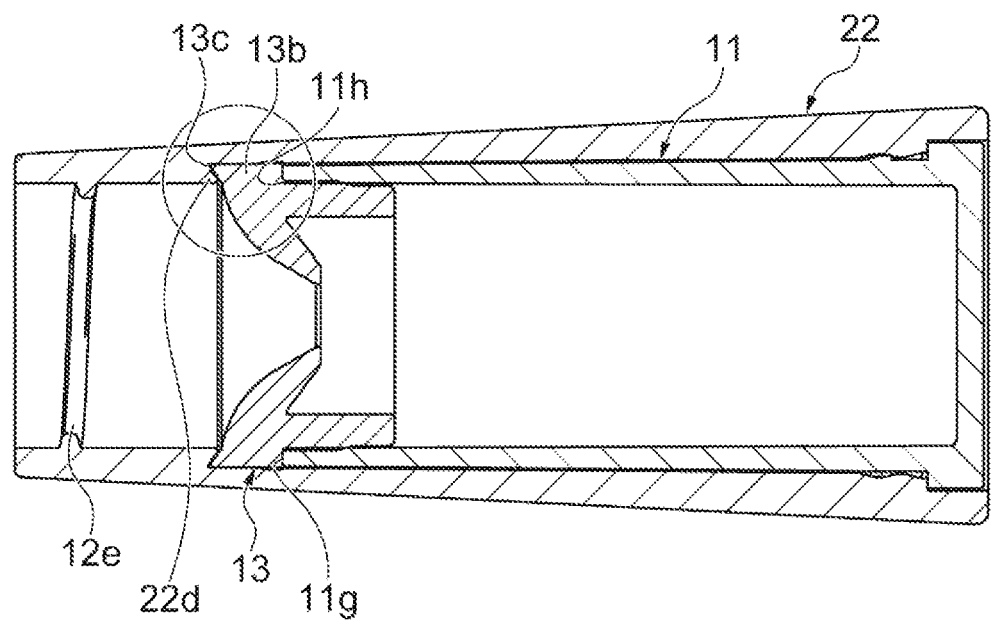
FIG. 22A is a longitudinal sectional view illustrating the cover, a filling unit, and a wiper of the example application container of FIG. 21A.
Figure 22B:
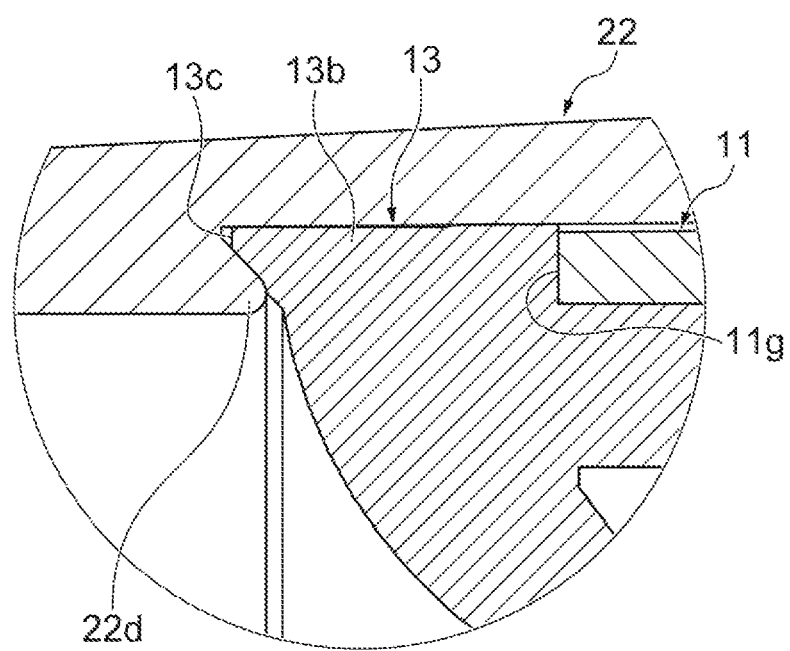
FIG. 22B is an enlarged sectional view illustrating the wiper of FIG. 22A, interposed between the filling unit and the wall portion of the cover illustrated in FIG. 22A.
Figure 23A:
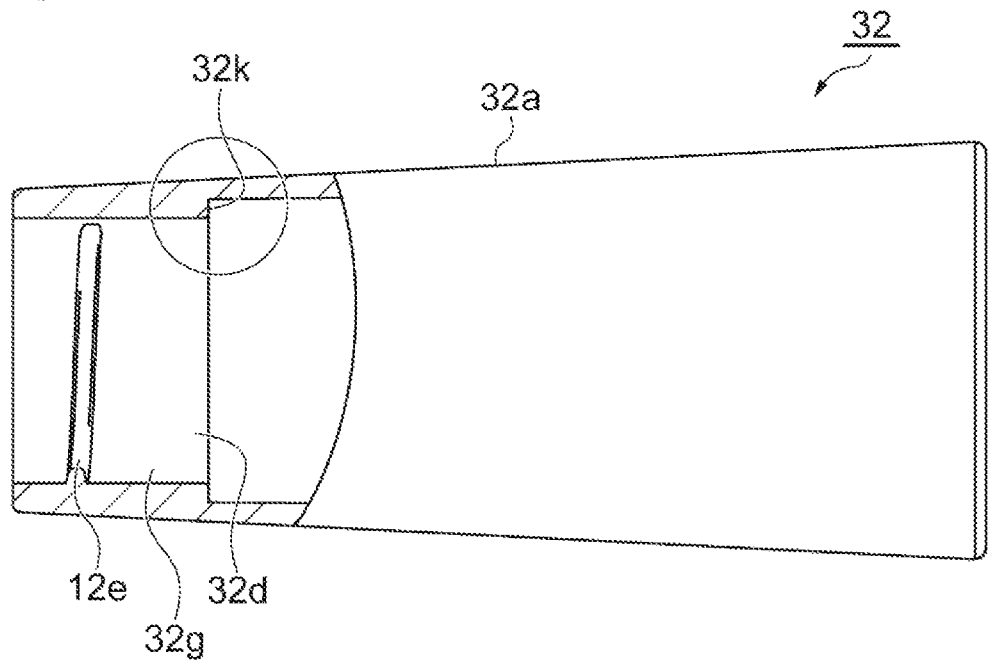
FIG. 23A is a partial sectional view illustrating a cover of an application container according to a second modification example.
Figure 23B:
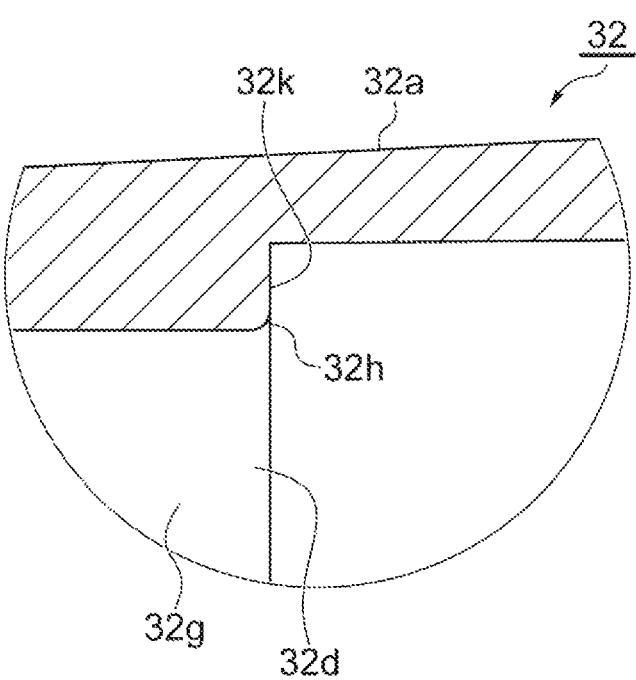
FIG. 23B is an enlarged sectional view illustrating a wall portion of the cover illustrated in FIG. 23A.
Figure 24A:
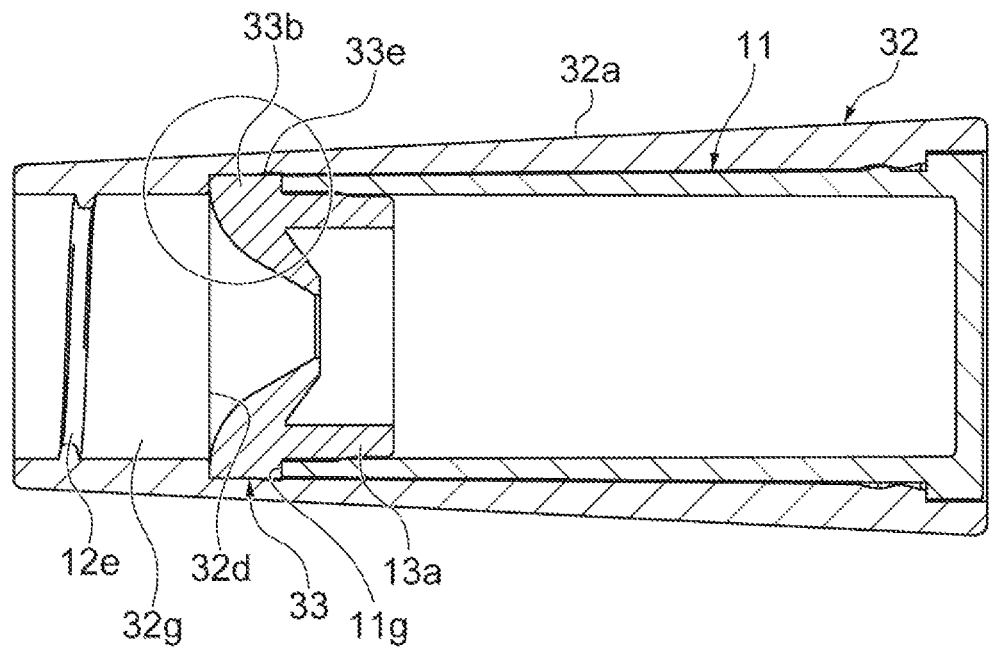
FIG. 24A is a longitudinal sectional view illustrating the cover, a filling unit, and a wiper of the example application container of FIG. 23A.
Figure 24B:
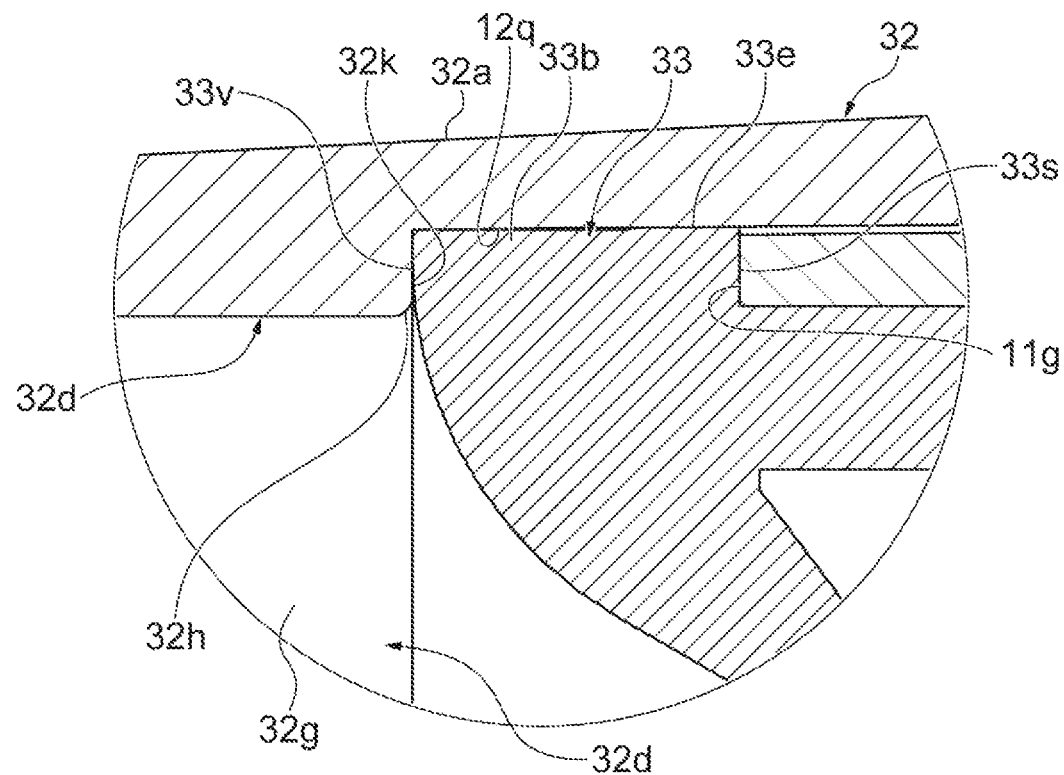
FIG. 24B is an enlarged sectional view illustrating the wiper of FIG. 24A, interposed between the filling unit and the wall portion of the cover illustrated in FIG. 24A.

FIG. 20A is a longitudinal sectional view of the container 10 including the filling unit 11, the cover 12, and the wiper 13, taken along a plane including the axis L. FIG. 20B is an enlarged sectional view illustrating the wall portion 12d, the first protruding portion 13b, and one end 11g of the filling unit 11 in FIG. 20A. In the wiper 13, the extension portion 13a is inserted into the opening 11h of the filling unit 11 from the front side. The whole first side surface 13e closely adheres to the inner surface 11a of the filling unit 11, and the protruding surface 13s of the first protruding portion 13b comes into contact with one end 11g.

The filling unit 11 having the wiper 13 mounted thereon as described above is inserted into the cover 12 from the rear side. The wiper 13 and the filling unit 11 which are inserted into the cover 12 engage with the cover 12 in the axial direction in a state where the second protruding portion 13c of the wiper 13 is in contact with the wall portion 12d of the cover 12 in the axial direction. For example, the filling unit 11 and the wiper 13 may engage with the cover 12 in the axial direction by fitting the annular projection portion 11e into a recess portion of the annular irregular portion 12p of the cover 12. A position in the forward-rearward direction of the rear end 11j of the filling unit 11 engaging with the cover 12 in the axial direction substantially coincides with a position in the forward-rearward direction of the rear end 12m of the cover 12 (or located slightly forward of the rear end 12m).

Then, in the wiper 13 mounted on the filling unit 11, the annular surface 13v and the inclined surface 13w of the second protruding portion 13c enters the bent portion 12h and the inclined surface 12*j* of the wall portion 12*d*. In this manner, the wiper 13 is pressed against the cover 12 in the axial direction, and closely adheres to the wall portion 12*d*. The outer surface of the extension portion 13*a*, which is the portion excluding the first protruding portion 13*b* of the wiper 13, adheres closely to the inner surface 11*a* of the filling unit 11 in an airtight state or manner. The wiper 13 mounted on the filling unit 11 is pressed against the cover 12 in the axial direction. In this manner, the first protruding portion 13*b* of the wiper 13 is interposed between each of the plurality of wall portions 12*d* and one end 11*g* on the opening 11*h* side of the filling unit 11 in the axial direction. The first protruding portion 13*b* adheres closely to the inner surface 12*q* of the cover 12 in an airtight state.

With reference to FIGS. 2 and 5, an example procedure for feeding the bar-shaped application material M of the application container 1 is described. In the example application container 1, in an initial state illustrated in FIG. 2, the cap C is removed, and the leading cylinder 3 is exposed. The leading cylinder 3 is rotated relative to the coupling cylinder 5, in a first direction (for example, clockwise) which is a feeding direction of the bar-shaped application material M. When the leading cylinder 3 is rotated in the first direction, relative to the coupling cylinder 5, the moving body 7 synchronously rotated with the leading cylinder 3 is rotated in the first direction relative to the holding member 8 synchronously rotated with respect to the coupling cylinder 5.

As a result of this relative rotation, the leading cylinder 3 is rotated relative to the middle cylinder 4. Accordingly, both of the leading cylinder 3 and the middle cylinder 4 are relatively rotated by rotational torques corresponding to rotational resistance applied between the leading cylinder 3 and the middle cylinder 4. A screwing operation is performed in the screw portion 20 which includes the male screw 7*j* of the moving body 7 and the spiral projection 8*d* of the holding member 8. The groove portion 7*c* of the moving body 7 and the ridge 3*k* of the inner surface of the leading cylinder 3 function as a detent for the moving body 7 against the leading cylinder 3, and the holding member 8 is restricted in moving rearward to the coupling cylinder 5. Accordingly, the moving body 7 slides forward to the leading cylinder 3 due to the above-described relative rotation. In this way, when the application material holder 9 moves forward to the leading cylinder 3 together with the moving body 7, the bar-shaped application material M appears from the opening 3*b* of the leading end of the leading cylinder 3, thereby bringing the bar-shaped application material M into a usable state or position.

The application tool T1 includes the holding member 8 positioned inside the coupling cylinder 5, and the engagement portion 14 inside the coupling cylinder 5 engages with the rear side cylindrical portion 8*c* of the holding member 8, thereby mounting the application tool T1 on the coupling cylinder 5. The engagement portion 14 includes the cylindrical portion 14*a* including the inner peripheral surface 14*h* into which the rear side cylindrical portion 8*c* is inserted to engage with the rear side cylindrical portion 8*c* and the connector 14*b* for connecting the coupling cylinder 5 and the cylindrical portion 14*a* to each other. The outer peripheral surface 14*i* of the cylindrical portion 14*a* is spaced apart (or separated) from the inner surface 5*i* of the coupling cylinder 5. The outer peripheral surface 14*i* of the cylindrical portion 14*a* engaging with the rear side cylindrical portion 8*c* is spaced part (or separated) from the inner surface 5*i*. Accordingly, the wall thickness t1 (refer to FIG. 14) of the coupling cylinder 5 in the portion facing the cylindrical portion 14*a* can be substantially equal to the wall thickness of the other portion of the coupling cylinder 5.

For example, the wall thickness of the coupling cylinder 5 can be made more uniform. Accordingly, a sink mark can be prevented or inhibited from appearing on the surface of the coupling cylinder 5, dimensional stability of the coupling cylinder 5 can be improved, and exterior quality can be improved. Furthermore, the outer peripheral surface 14*i* is spaced apart (or separated) from the inner surface 5*i*. Accordingly, the wall thickness of the cylindrical portion 14*a* can be made thinner, and more uniform. Accordingly, the sink mark can be prevented or inhibited from appearing in the cylindrical portion 14*a*, and the dimensional stability of the cylindrical portion 14*a* can be improved. For example, when the wall thickness of the cylindrical portion 14*a* is made thinner, the cylindrical portion 14*a* can be cured more rapidly. Accordingly, a sink mark can be prevented or inhibited from appearing in the cylindrical portion 14*a*. The cylindrical portion 14*a* may engage in a more reliable, smooth and/or stable manner with the rear side cylindrical portion 8*c*, by virtue of the improved dimensional stability of the cylindrical portion 14*a* engaging with the rear side cylindrical portion 8*c*.

In some examples of the application container 1, the application tool T1 includes the bar-shaped application material M positioned on the front side (or at the front end) of the coupling cylinder 5, and the feeding mechanism 15 for feeding the bar-shaped application material M forward. The sink mark can be prevented or inhibited from appearing in the application container 1 for feeding the bar-shaped application material M forward. Accordingly, the feeding mechanism 15 can feed the bar-shaped application material M in a more reliable and stable manner.

In some examples of the application container 1, the application tool T2 positioned behind the coupling cylinder 5. The sink mark can be prevented or inhibited from appearing in the application container 1 including the plurality of types of the application tools T1 and T2.

In some examples, the application container 1 includes the container 10 to be attached to the opening 5*b* on the rear side of the coupling cylinder 5. The container 10 contains the application material A to be applied by the application tool T2. The inclined surface 5*n* of the coupling cylinder 5 increases in diameter rearwardly from the front side. The outer diameter of the inclined surface 12*a* of the cover 12 is larger than the outer diameter of the inclined surface 5*n* of the coupling cylinder 5. Accordingly, a large amount of the application material A can be contained in the container 10 having the cover 12 having the large outer diameter. Furthermore, as described above, the inclined surface 5*n* of the coupling cylinder 5 increases in diameter rearwardly, toward the container 10 side. Accordingly, even in a case where the container 10 having the cover 12 having the larger outer diameter than the coupling cylinder 5 is attached to the coupling cylinder 5, the wall thickness of the coupling cylinder 5 can be made more uniform.

In some examples of the application container 1, the connector 14*b* extends along the radial direction of the coupling cylinder 5. Accordingly, the coupling cylinder 5 and the cylindrical portion 14*a* having a constant wall thickness can be easily manufactured by means of integral molding.

In some examples, the average wall thickness of the connector 14*b* is equal to or less than 60% of the average wall thickness of the coupling cylinder 5. Accordingly, the wall of the connector 14*b* (for example, the wall thickness of the connector 14*b* in the axial direction) can be made thinner, and a wall thickness at a thicker portion of the coupling cylinder 5 can be reduced. As a result, the sink mark can be more reliably prevented or inhibited from appearing.

In some examples, the inner peripheral surface 14h of the cylindrical portion 14a has ridges 14k extending in the axial direction and spaced apart along the circumferential direction of the cylindrical portion 14a. The ridges 14k engage with the rear side cylindrical portion 8c in the rotation direction. As a result, the engagement between the rear side cylindrical portion 8c and the cylindrical portion 14a can be achieved by a relatively simple configuration.

In some examples, the rear side cylindrical portion 8c includes the elastic protruding portion 8e which is elastic in the radial direction. The ridges 14k engage with the elastic protruding portion 8e in the rotation direction. The elastic protruding portion 8e and the ridges 14k disengage from each other when the rotation force of the application tool T1 which is applied to the coupling cylinder 5 exceeds a threshold value. According to this configuration, the bar-shaped application material M is moved forward to the forward movement limit by feeding the bar-shaped application material M. When the rotation force for rotating the application tool T1 relative to the coupling cylinder 5 exceeds a threshold value (e.g., has a prescribed or greater value), the elastic protruding portion 8e disengages from the ridges 14k. Accordingly, the application tool T1 or the coupling cylinder 5 (specifically, the engagement portion 14) can be more reliably prevented from being damaged.

An application container according to a first modified example, with reference to FIGS. 21A, 21B, 22A, and 22B, includes a cover 22.

The front side of the inner surface 12q of the cover 22 has a wall portion 22d protruding inward in the radial direction. For example, the cover 22 has one wall portion 22d, and the wall portion 22d is formed on the entire periphery along the circumferential direction of the cover 22. In some examples, the "wall portion formed on the entire periphery along the circumferential direction" may include both a wall portion extending throughout the entire circumferential direction and a wall portion extending throughout the entire circumferential direction and having an intermittent portion in a portion in the circumferential direction. For example, the "wall portion formed on the entire periphery along the circumferential direction" may include a wall portion having a portion which does not protrude in a portion in the circumferential direction on the inner surface of the cover.

The wall portion 22d has an inner surface 22g extending in a direction away from an outer surface 22a of the cover 22 as the inner surface 22g is oriented rearward (inner side of the outer surface 22a in the radial direction and in a direction in which the cover 22 becomes thicker), a bent portion 22h folded forwardly and outwardly in the radial direction from the rear end of the inner surface 22g, an inclined surface 22j inclined forwardly from the bent portion 22h to extend outward in the radial direction, and a flat portion 22k extending further outward in the radial direction from an end portion outside in the radial direction of the inclined surface 22j. The inner surface 22g may extend along the axis L, and parallel to the axis L, for example. However, the inner surface 22g may extend non-parallel to the axis L. For example, the inner surface 22g may be inclined in a direction away from the axis L as the inner surface 22g is oriented rearwardly. Similarly to the above-described example, the wiper 13 mounted on the filling unit 11 is pressed against the cover 22 in the axial direction (e.g., forward), and the first protruding portion 13b of the wiper 13 is interposed in the axial direction between the wall portion 22d and one end 11g of the filling unit 11.

The first protruding portion 13b is fixed in a state of being interposed in the axial direction between the wall portion 22d of the inner surface 12q of the cover 22 and one end 11g on the opening 11h side of the filling unit 11. Therefore, a configuration can be adopted so that the force acting in the axial direction is less likely to be applied to the first protruding portion 13b of the wiper 13. Accordingly, it is possible to prevent the position of the wiper 13 from being misaligned with the inner surface 12q of the cover 22 and the filling unit 11. As a result, it is possible to prevent the wiper 13 from being detached.

The wall portion 22d extends throughout the circumferential direction of the cover 22 on the inner surface 12q of the cover 22. Accordingly, a large contact area of the wall portion 22d in contact with the wiper 13 (e.g., second protruding portion 13c) can be secured. Therefore, it is possible to more reliably prevent the wiper 13 from being detached, and it is possible to further improve airtightness obtained by the wiper 13.

An application container according to a second modified example with reference to FIGS. 23A, 23B, 24A, and 24B, includes a cover 32 and a wiper 33.

Similarly to the cover 22 of the first modified example, the cover 32 includes a wall portion 32d, and the wall portion 32d is formed on the entire periphery of the cover 32 in the circumferential direction. The wall portion 32d includes an inner surface 32g extending in a direction away from an outer surface 32a of the cover 32 as the inner surface 32g is oriented rearwardly, a bent portion 32h that is bent outwardly in the radial direction from the rear end of the inner surface 32g, and a flat surface 32k extending outwardly in the radial direction from the bent portion 32h. For example, an angle of the flat surface 32k with respect to the axial direction may be approximately 90°. Similarly to the inner surface 22g, the inner surface 32g extends along the axis L. For example, the inner surface 32g may extend parallel to the axis L. Alternatively, the inner surface 32g may be inclined in a direction away from the axis L as the inner surface 32g is oriented rearward.

The wiper 33 does not have any portion corresponding to the second protruding portion 13c of the wiper 13 of the first modified example. The wiper 33 has a first protruding portion 33b which protrudes outwardly in the radial direction in the front end of the extension portion 13a. The first protruding portion 33b has a protruding surface 33s extending outwardly in the radial direction from the front end of the extension portion 13a, an outer peripheral surface 33e extending forward from an end portion outside in the radial direction of the protruding surface 33s, and an annular surface 33v extending inward in the radial direction from the front end of the outer peripheral surface 33e. For example, the angle of the annular surface 33v with respect to the outer peripheral surface 33e may be substantially the same as the angle of the flat surface 32k with respect to the axial direction, and may be set to approximately 90°.

The wiper 33 is mounted on the filling unit 11, and is pressed against the cover 32 in the axial direction. The first protruding portion 33b of the wiper 33 is interposed in the axial direction between the wall portion 32d and the one end 11g of the filling unit 11. For example, the outer peripheral surface 33e of the first protruding portion 33b adheres closely to the inner surface 12q of the cover 32, the one end 11g comes into contact with the protruding surface 33s, and the flat surface 32k of the wall portion 32d comes into contact with the annular surface 33v.

The first protruding portion 33*b* is fixed in a state of being interposed in the axial direction between the wall portion 32*d* of the cover 32 and the one end 11*g* of the filling unit 11. Accordingly, a configuration can be adopted so that the force acting in the axial direction is less likely to be applied to the first protruding portion 33*b*. Therefore, it is possible to prevent the position of the wiper 33 from being misaligned with the cover 32 and the filling unit 11.

It is to be understood that not all aspects, advantages and features described herein may necessarily be achieved by, or included in, any one particular example. Indeed, having described and illustrated various examples herein, it should be apparent that other examples may be modified in arrangement and detail. For example, in the above-described examples, it is also possible to change a shape of the coupling cylinder and the engagement portion. In addition, it is possible to appropriately change a size, a material, and an arrangement of the coupling cylinder and the engagement portion. For example, each of the coupling cylinder and the cylindrical portion of the engagement portion is not limited to the cylindrical shape, and may have a polygonal tube shape. The central axis of the cylindrical portion may be offset from the axis L which is the central axis of the coupling cylinder. The connector of the engagement portion may not extend along the radial direction, and may extend along a direction inclined with respect to the radial direction.

In some of the above-described examples, the engagement target portion to engage with the engagement portion is the rear side cylindrical portion 8*c* of the holding member 8. However, the engagement target portion may not be the rear side cylindrical portion 8*c*. That is, a shape, a size, a material, and an arrangement form of the engagement target portion may be different from those of the rear side cylindrical portion 8*c*. For example, the shape of the engagement target portion may not be cylindrical, and may be other shapes. In addition, the protruding portion may not be the elastic protruding portion 8*e*. That is, a shape, a size, a material, and an arrangement form of the protruding portion may be different from those of the elastic protruding portion 8*e*. In addition, in some of the above-described examples, the rear side cylindrical portion 8*c* engages with the cylindrical portion 14*a* of the engagement portion 14 in the rotation direction. However, a form in which the engagement target portion engages with the engagement portion is not limited to the above-described configuration. For example, the engagement target portion may engage with the engagement portion in the axial direction. In this case, for example, the engagement target portion and the engagement portion may have a latching mechanism or a screw mechanism for attaching the engagement target portion to the engagement portion in the axial direction.

In some of the above-described examples, as illustrated in FIG. 5 for example, the bar-shaped application material M has been described which includes the inclined portion M1, the pair of flat surfaces M2, and the side surface M3 extending in the axial direction. However, a shape, a size, a material, and an arrangement form of the application material can be appropriately changed. Furthermore, in some of the above-described examples, the application container 1 has been described to include the application tools T1 and T2, the coupling cylinder 5, the engagement portion 14, and the container 10. However, a shape, a size, a material, and an arrangement form of the application tools T1 and T2 can be appropriately changed. The configuration of the components configuring the application container can be appropriately changed. For example, the application container may not include the application tool T2 nor the container 10. In this case, for example, the application container may include a tail plug for closing the opening 5*b* on the rear side of the coupling cylinder 5.

In some of the above-described examples, the application container 1 has been described to include the rotary feeding mechanism 15 for moving the bar-shaped application material M forward by relative rotation between the leading cylinder 3 and the coupling cylinder 5. However, the feeding mechanism of the application container is not limited to the above-described example, and can be appropriately changed. For example, the feeding mechanism may be a mechanical extrusion mechanism such as a knock type or a squeeze type extrusion mechanism. Furthermore, the application container may not include the feeding mechanism. For example, the application container may include the application tool such as a brush, a pen, or sponge, and the cap. A type of the application tools T1 and T2 is not limited to the examples described herein. For example, the application tool may include various cosmetics such as an eyeliner, an eyebrow liner, a concealer, or a lip liner. The application tool may include a writing tool, a design pencil, or a drawing material.

What is claimed is:

1. An application container comprising:
    a main body cylinder having an opening and an inner surface extending in an axial direction;
    an engagement portion located inside the main body cylinder, the engagement portion including:
        a cylindrical portion that extends in the axial direction, wherein the cylindrical portion includes an inner peripheral surface, and an outer peripheral surface opposite the inner peripheral surface, wherein the outer peripheral surface of the cylindrical portion is spaced apart from the inner surface of the main body cylinder; and
        a connector joining the main body cylinder with the cylindrical portion of the engagement portion; and
    an application tool at least partially insertable into the main body cylinder through the opening of the main body cylinder to engage with the engagement portion, wherein the application tool includes:
        an engagement target portion to engage the inner peripheral surface of the cylindrical portion of the engagement portion;
        a flange portion that extends from the engagement target portion, wherein the flange portion has a diameter that is greater than a diameter of the engagement target portion to contact the connector of the engagement portion; and
        a middle cylinder to engage with the main body cylinder in the axial direction, wherein the flange portion is interposed between the middle cylinder of the application tool and the connector of the engagement portion, in the axial direction, when the engagement target portion of the application tool is positioned in the cylindrical portion of the engagement portion.

2. The application container according to claim 1, wherein the application tool farther includes an application material and an application material holder configured to support the application material, wherein the application material holder is displaceable in the axial direction of the main body cylinder to feed the application material away from the main body cylinder.

3. The application container according to claim 1, wherein the application tool is a first application tool positioned at a first end of the main body cylinder through the opening, and wherein the main body cylinder includes a second end opposite the first end, and wherein the application container further comprises a second application tool located at the second end of the main body cylinder.

4. The application container according to claim 3, wherein the main body cylinder has an outer diameter that increases from the first end toward the second end, wherein the opening is a first opening located at the first end, and the main body cylinder includes a second opening at the second end, wherein the first application tool includes a first application material, wherein the application container further comprises a container portion attachable to the second opening of the main body cylinder, wherein the container portion contains a second application material to be applied by the second application tool, and wherein a maximum outer diameter of the container portion is greater than a maximum outer diameter of the main body cylinder.

5. The application container according to claim 1, wherein the connector extends along a radial direction of the main body cylinder.

6. The application container according to claim 5, wherein a wall thickness of the connector is equal to or less than 60% of a wall thickness of the main body cylinder.

7. The application container according to claim 1, wherein the inner peripheral surface of the cylindrical portion has ridges that are spaced apart in a circumferential direction of the inner peripheral surface of the cylindrical portion and that extend in the axial direction of the cylindrical portion to engage into rotation with the engagement target portion of the application tool.

8. The application container according to claim 7, wherein the engagement target portion of the application tool extends along a longitudinal axis of the application tool, and includes a protruding portion which is elastic in a radial direction relative to the longitudinal axis of the application tool, wherein the ridges of the inner peripheral surface of the cylindrical portion are configured to engage into rotation with the protruding portion of the engagement target portion, and wherein the protruding portion is configured to disengage from the ridges, when a rotational force of the application tool with respect to the main body cylinder exceeds a threshold value.

9. An application container comprising:

a main body cylinder having a first end that forms an opening, a second end opposite the first end in an axial direction of the main body cylinder, and an inner surface extending between the first end and the second end;

an engagement portion positioned within the main body cylinder, the engagement portion including:
  a cylindrical portion that is spaced apart from the inner surface of the main body cylinder; and
  a connector that extends between the cylindrical portion and the main body cylinder; and an application tool at least partially insertable into the main body cylinder through the opening of the main body cylinder to engage with the engagement portion, wherein the application tool includes:
  an engagement target portion to engage an inner peripheral surface of the cylindrical portion of the engagement portion;
  a flange portion that extends from the engagement target portion, wherein the flange portion has a diameter that is greater than a diameter of the engagement target portion; and
  a middle cylinder that is insertable into the main body cylinder in the axial direction, to abut the flange portion so as to interpose the flange portion between the middle cylinder of the application tool and the connector of the engagement portion in the axial direction, when the application tool is engaged with the engagement portion.

10. The application container according to claim 9, wherein the application tool comprises a holding member that includes the engagement target portion and the flange portion, and wherein the middle cylinder includes an end surface to contact the flange portion of the holding member.

11. The application container according to claim 9, wherein the connector of the engagement portion extends substantially orthogonally with respect to axial direction of the main body cylinder, to limit a displacement of the application tool in the axial direction when the flange portion of the application tool contacts the connector.

12. The application container according to claim 9, wherein the engagement target portion has a length that is no longer than a length of the cylindrical portion of the engagement portion, to position a longitudinal end of the application tool formed by the engagement target portion within the cylindrical portion when the flange portion of the application tool contacts the connector of the engagement portion.

13. The application container according to claim 9, wherein the engagement target portion of the application tool has an outer surface to engage slidably in the axial direction, with an inner surface of the cylindrical portion.

14. The application container according to claim 9, wherein the application tool further includes an application material holder to hold an application material, and a screw coupling located between the flange portion and the application material holder to displace the application material relative to the main body cylinder in the axial direction.

15. The application container according to claim 9, wherein the opening of the main body cylinder forms a first opening located at the first end of the main body cylinder, and wherein the main body cylinder includes a second opening located at the second end, and wherein the cylindrical portion extends in the axial direction between the first opening and the second opening of the main body cylinder.

16. The application container according to claim 1, wherein the opening of the main body cylinder is a first opening formed at a first end of the main body cylinder, wherein the main body cylinder forms a second opening located at a second end of the main body cylinder opposite the first end in the axial direction, and wherein the engagement portion extends between the first opening and the second opening of the main body cylinder.

17. The application container according to claim 16, wherein the cylindrical portion of the engagement portion extends between the connector and the second opening of the main body cylinder.

18. The application container according to claim 1, wherein the engagement target portion has a length that is no longer than a length of the cylindrical portion of the engagement portion, to position a longitudinal end of the application tool formed by the engagement target portion within the cylindrical portion when the flange portion of the application tool contacts the connector of the engagement portion.

19. The application container according to claim 3,
wherein the first application tool includes a first base end connected to the cylindrical portion of the engagement portion within the main body cylinder, and a first application end located outside of the main body cylinder, that is configured to apply a first application material, and
wherein the second application tool includes a second base end connected to the main body cylinder, and a second application end located outside the main body cylinder, that is configured to apply a second application material.

20. The application container according to claim 3,
wherein the main body cylinder forms a first accommodation portion between the cylindrical portion of the engagement portion and the first end to receive the first application tool, and a second accommodation portion between the cylindrical portion and the second end to receive the second application tool.

* * * * *